US012739742B2

(12) United States Patent
Kung et al.

(10) Patent No.: US 12,739,742 B2
(45) Date of Patent: Sep. 15, 2026

(54) METHOD AND APPARATUS FOR UPLINK TIME ALIGNMENT IN A WIRELESS COMMUNICATION SYSTEM

(71) Applicant: ASUSTek Computer Inc., Taipei City (TW)

(72) Inventors: Yi-Hsuan Kung, Taipei City (TW); Yu-Hsuan Guo, Taipei City (TW)

(73) Assignee: ASUSTEK COMPUTER INC., Taipei City (TW)

( * ) Notice: Subject to any disclaimer, the term of this patent is extended or adjusted under 35 U.S.C. 154(b) by 699 days.

(21) Appl. No.: 18/081,734

(22) Filed: Dec. 15, 2022

(65) Prior Publication Data

US 2023/0199638 A1 Jun. 22, 2023

Related U.S. Application Data

(60) Provisional application No. 63/290,869, filed on Dec. 17, 2021.

(51) Int. Cl.

*H04W 48/20* (2009.01)
*H04W 74/0833* (2024.01)
*H04W 74/0836* (2024.01)
*H04W 74/0838* (2024.01)

(52) U.S. Cl.

CPC ........ *H04W 48/20* (2013.01); *H04W 74/0833* (2013.01); *H04W 74/0836* (2024.01); *H04W 74/0838* (2024.01)

(58) Field of Classification Search

CPC ............. H04W 48/20; H04W 74/0833; H04W 74/0838; H04W 74/0836

See application file for complete search history.

(56) References Cited

U.S. PATENT DOCUMENTS

2018/0124724 A1* 5/2018 Tsai .................. H04W 56/0045
2018/0324872 A1* 11/2018 Babaei ................ H04W 72/543
2020/0205103 A1 6/2020 Kwon et al.

(Continued)

FOREIGN PATENT DOCUMENTS

CN 103327637 A 9/2013
CN 106851812 A 6/2017

(Continued)

OTHER PUBLICATIONS

Corresponding Korean Intellectual Property Office Application No. 10-2022-0175906, Office Action dated Aug. 127, 2025, 16 pages.

(Continued)

*Primary Examiner* — Tonia L Dollinger

(74) *Attorney, Agent, or Firm* — Cooper Legal Group LLC

(57) ABSTRACT

A method and apparatus are disclosed. In an example from the perspective of a User Equipment (UE), the UE receives a first signaling indicating a configuration of a first cell, wherein the first cell is associated with a first timing advance group (TAG). The UE receives a second signaling indicative of addition of the first cell as a first Serving Cell. In response to the second signaling, the UE (i) adds the first cell as the first Serving Cell, and (ii) determines whether to initiate a random access procedure based on the second signaling, and/or based on whether the first cell is associated with a first valid timing advance value.

20 Claims, 22 Drawing Sheets

(56) References Cited

U.S. PATENT DOCUMENTS

| | | | | |
|---|---|---|---|---|
| 2021/0307055 | A1* | 9/2021 | Tsai | H04W 72/23 |
| 2021/0368464 | A1 | 11/2021 | Kwon et al. | |
| 2024/0023045 | A1* | 1/2024 | Da Silva | H04W 36/249 |

FOREIGN PATENT DOCUMENTS

| | | | |
|---|---|---|---|
| CN | 112292883 | A | 1/2021 |
| CN | 113543182 | A | 10/2021 |
| EP | 3893588 | A1 | 10/2021 |
| KR | 1020130107984 | A | 10/2013 |
| WO | 2016117886 | A1 | 7/2016 |
| WO | 2021066700 | A1 | 4/2021 |

OTHER PUBLICATIONS

Corresponding Chinese Intellectual Property Office Application No. 202211618047.5, Office Action dated Aug. 11, 2025, 16 pages.

* cited by examiner

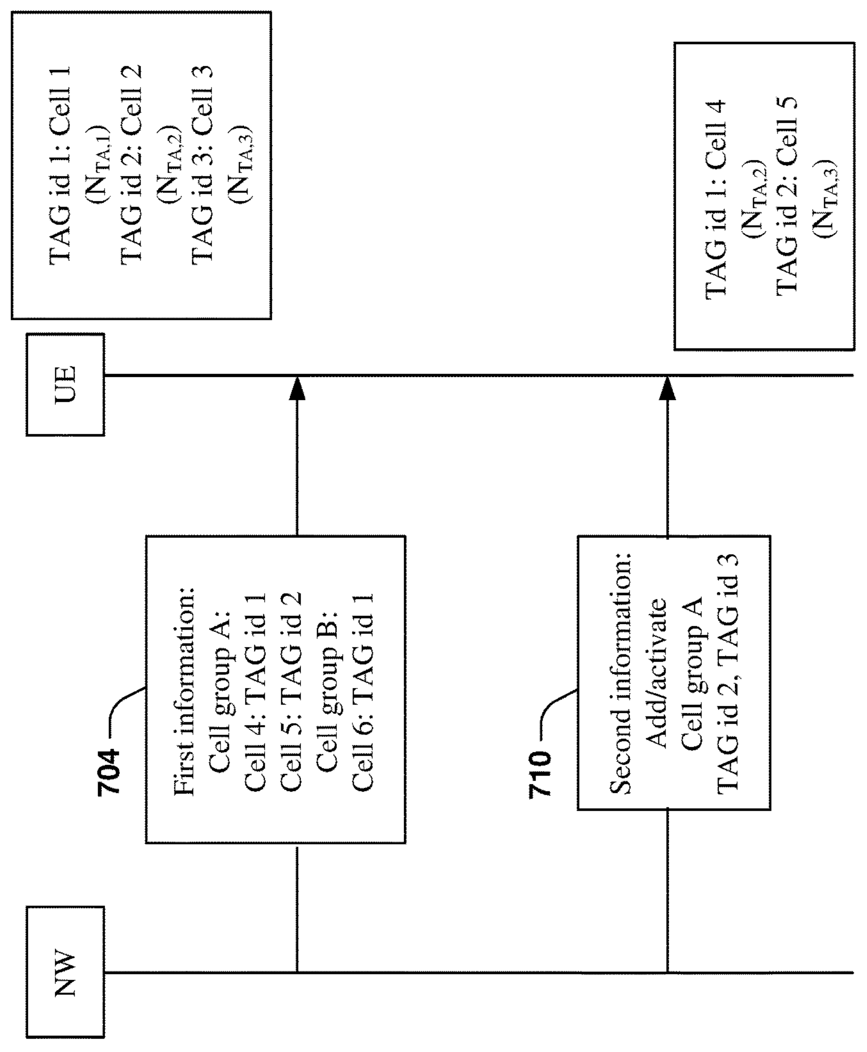
FIG. 7

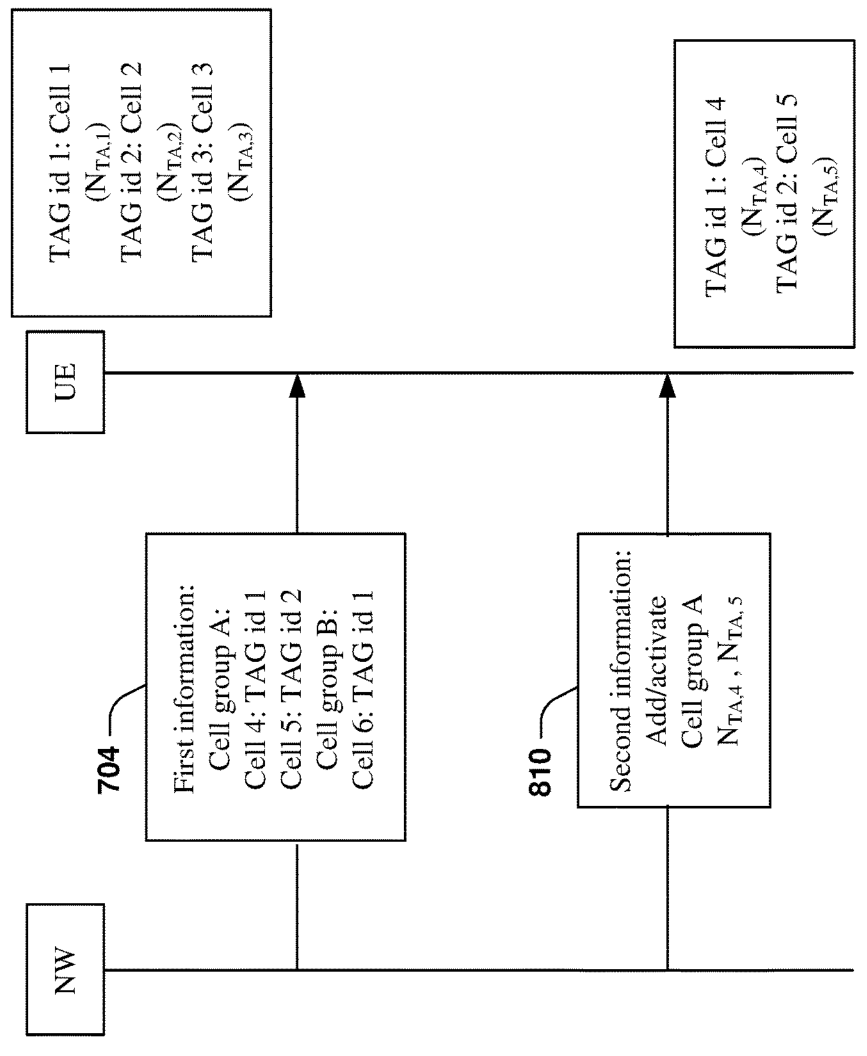
FIG. 8

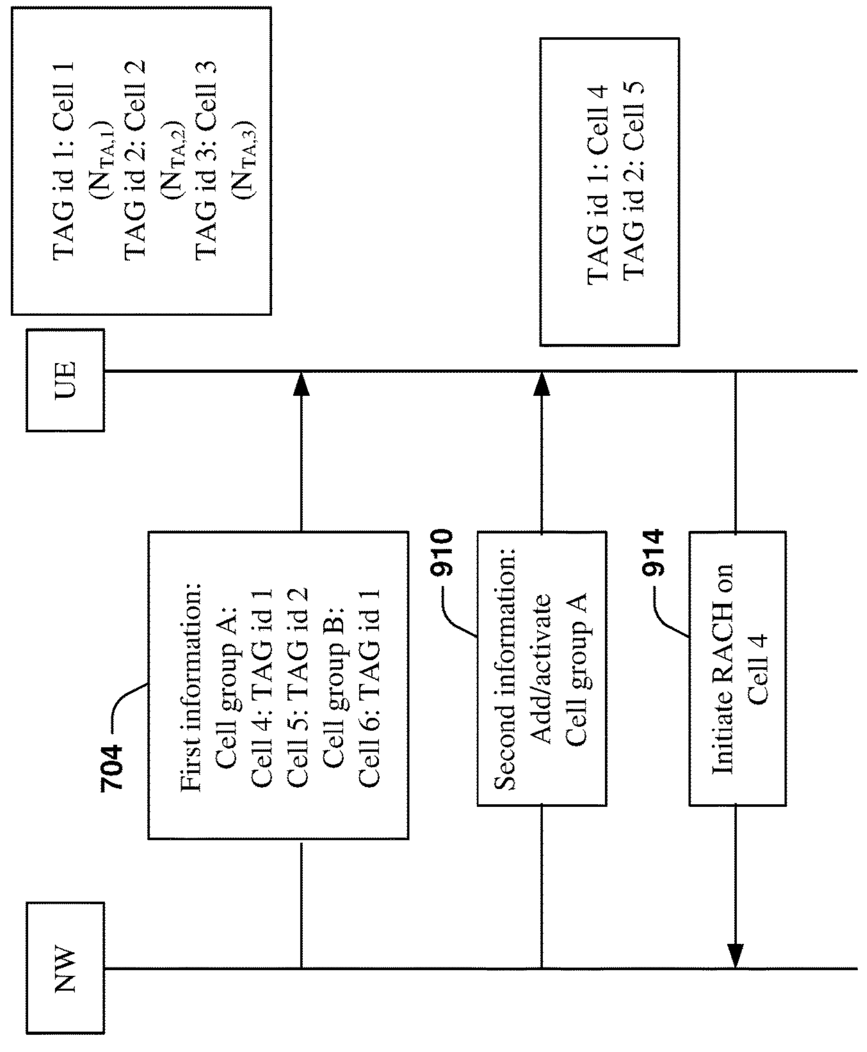
FIG. 9

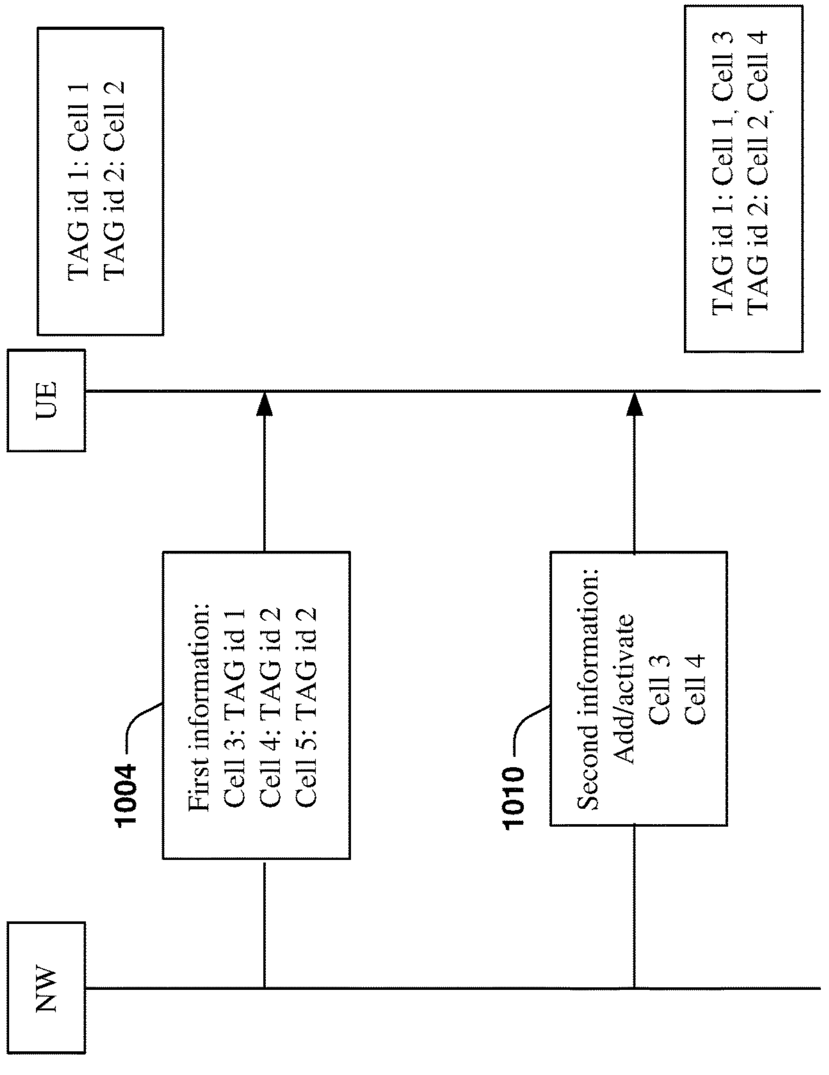
FIG. 10

1200

1400

1600

1700

2100

METHOD AND APPARATUS FOR UPLINK TIME ALIGNMENT IN A WIRELESS COMMUNICATION SYSTEM

CROSS-REFERENCE TO RELATED APPLICATIONS

The present application claims the benefit of U.S. Provisional Patent Application Ser. No. 63/290,869 filed on Dec. 17, 2021, the entire disclosure of which is incorporated herein in its entirety by reference.

FIELD

This disclosure generally relates to wireless communication networks, and more particularly, to a method and apparatus for uplink time alignment in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives a first signaling indicating a configuration of a first cell, wherein the first cell is associated with a first timing advance group (TAG). The UE receives a second signaling indicative of addition of the first cell as a first Serving Cell. In response to the second signaling, the UE (i) adds the first cell as the first Serving Cell, and (ii) determines whether to initiate a random access procedure based on the second signaling, and/or based on whether the first cell is associated with a first valid timing advance value.

BRIEF DESCRIPTION OF THE DRAWINGS

FIG. 7 is a diagram illustrating an exemplary scenario associated with a UE and a network according to one exemplary embodiment.

FIG. 8 is a diagram illustrating an exemplary scenario associated with a UE and a network according to one exemplary embodiment.

FIG. 9 is a diagram illustrating an exemplary scenario associated with a UE and a network according to one exemplary embodiment.

FIG. 10 is a diagram illustrating an exemplary scenario associated with a UE and a network according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3$^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-212710 NR further mobility enhancements; 3GPP specification 38.331 v16.6.0; 3GPP specification 38.321 v16.6.0; 3GPP specification 38.211 v16.7.0. The standards and documents listed above are hereby expressly incorporated by reference in their entirety.

Figure 1:
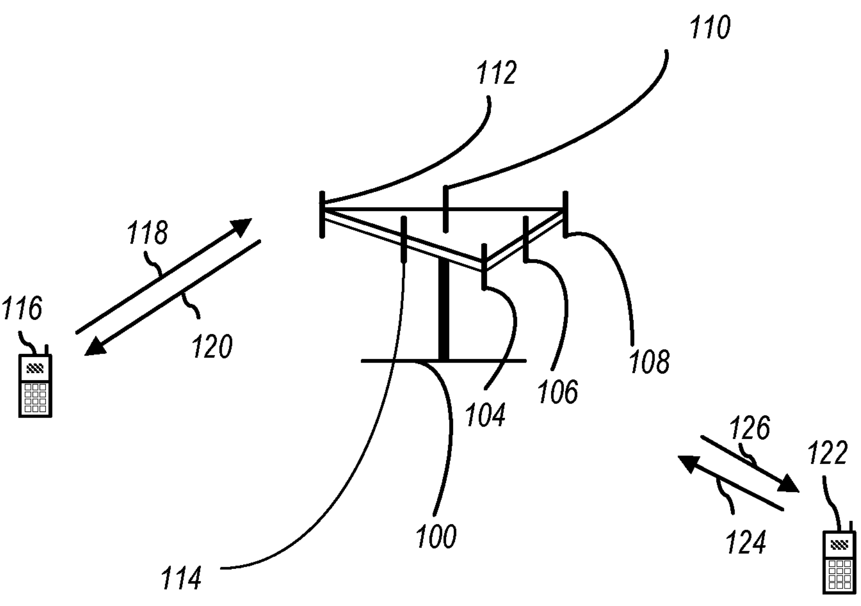
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
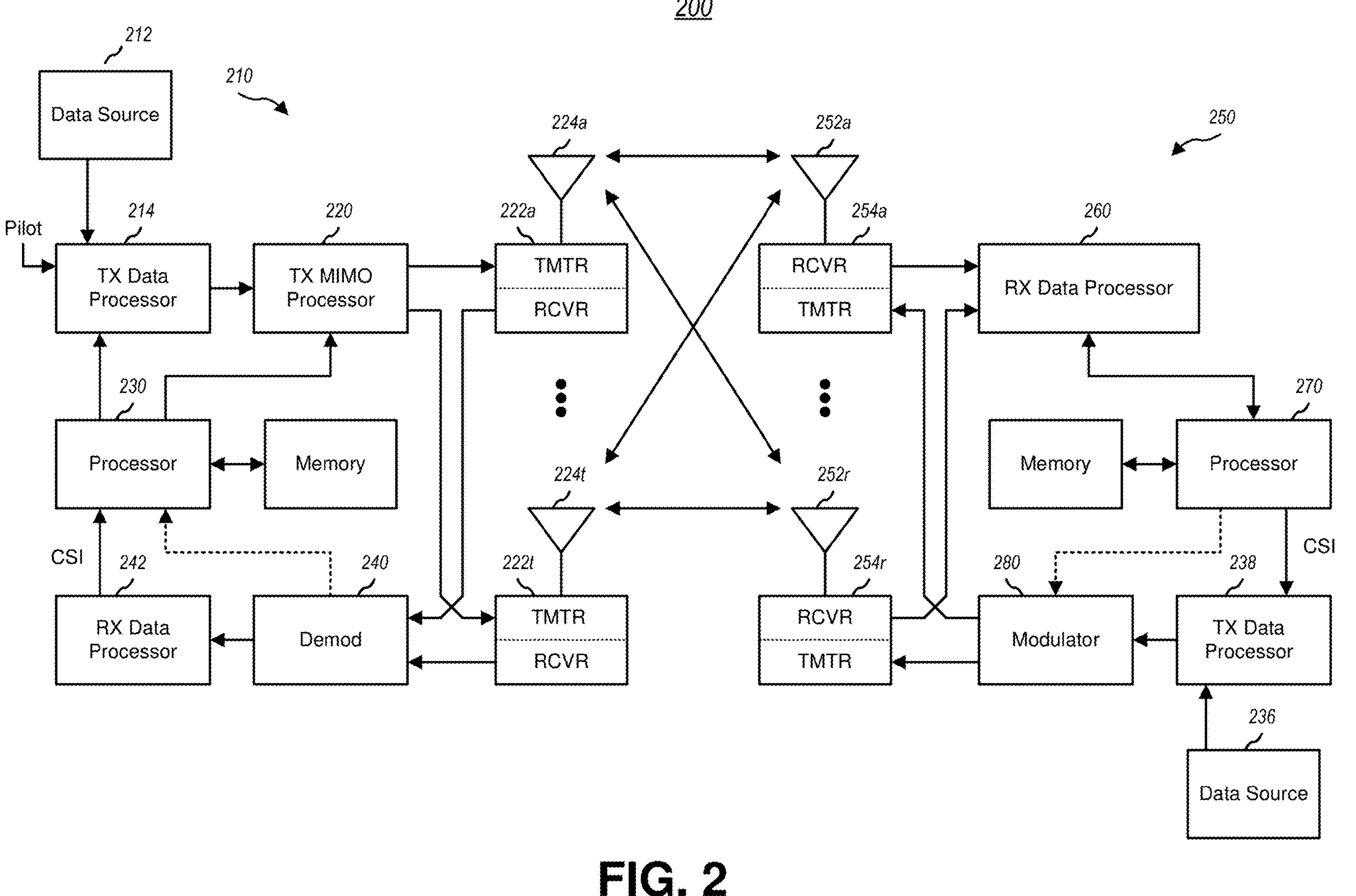
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) **222*a* through 222*t*. In certain embodiments, TX MIMO processor 220** may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters **222*a* through 222*t* may then be transmitted from $N_T$ antennas 224*a* through 224*t***, respectively.

At receiver system 250, the transmitted modulated signals are received by $N_R$ antennas **252*a* through 252*r* and the received signal from each antenna 252 may be provided to a respective receiver (RCVR) 254*a* through 254*r*. Each receiver 254** may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters **254*a* through 254*r*, and/or transmitted back to transmitter system 210**.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
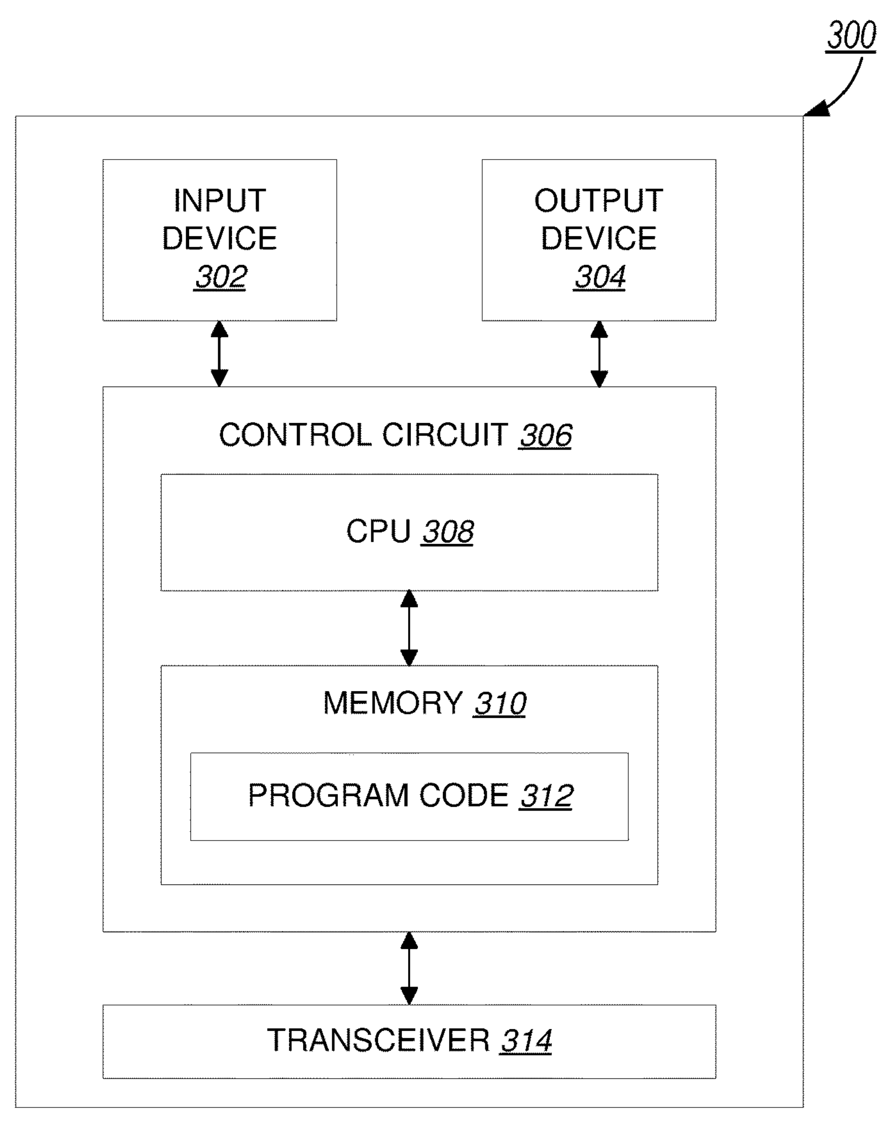
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
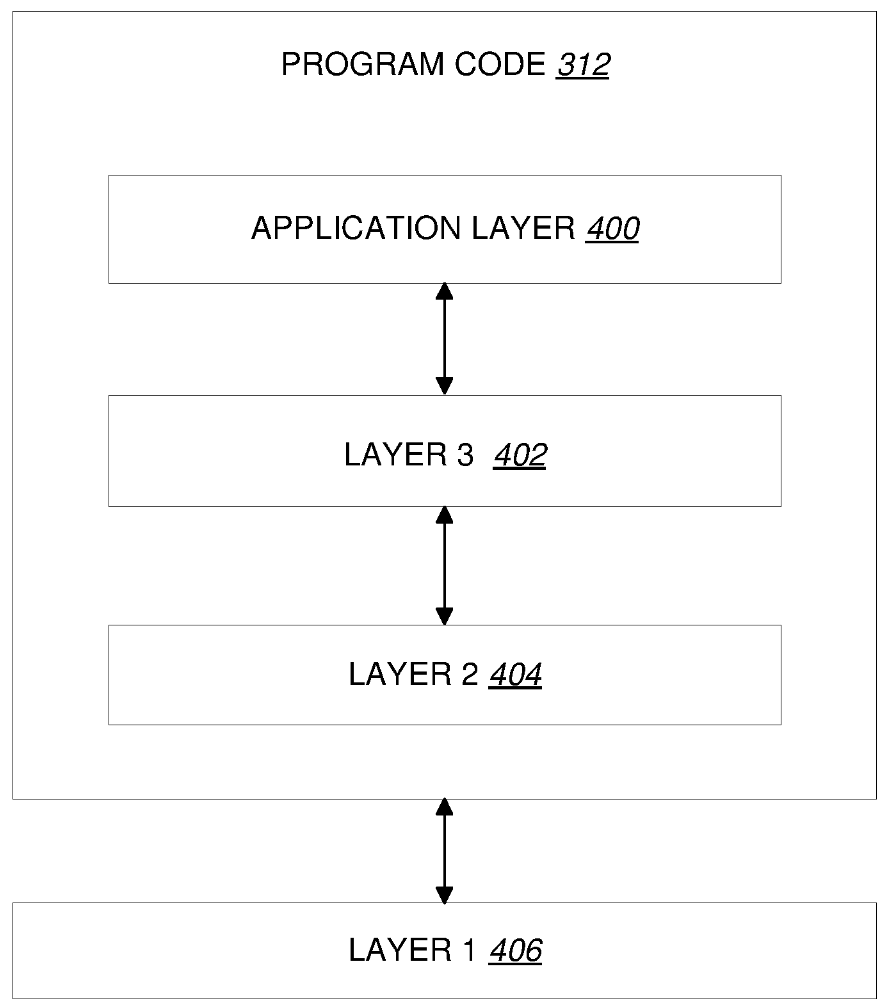
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

In New Work Item Description (WID) on NR further mobility enhancements provided in RP-212710, one or more objectives for enhancement on mobility for NR are discussed. One or more parts of RP-212710 are quoted below:

3 JUSTIFICATION

When the UE passes from the coverage area of one cell to another cell, at some point a serving cell change need to be performed. Currently serving cell change is triggered by L3 measurements and is done by RRC signalling triggered Reconfiguration with Synch for change of PCell and PSCell, as well as release add for SCells when applicable, all cases with complete L2 (and L1) resets, and involving more latency, more overhead and more interruption time than beam switch mobility. The goal of L1/L2 mobility enhancements is to be able to do serving cell change via L1/L2 signalling with such low latency, low overhead and low interruption time.

4 OBJECTIVE 4.1 Objective of Core Part WI

The detailed objective of this work item are:

1. To specify mechanism and procedures of L1/L2 based inter-cell mobility for mobility latency reduction:
   - Configuration and maintenance for multiple candidate cells to allow fast application of configurations for candidate cells [RAN2, RAN3]
   - Dynamic switch mechanism among candidate serving cells (including SpCell and SCell) for the potential applicable scenarios based on L1/L2 signalling [RAN2, RAN1]
   - L1 enhancements, including inter-cell beam management, L1 measurement and reporting, beam indication, and for non-synchronized scenario to handle TA management [RAN1, RAN2]
   - CU-DU interface signaling to support L1/L2 mobility, if needed [RAN3]
   - Note 1: FR2 specific enhancements are not precluded, if any.
   - Note 2: The procedure of L1/L2 based inter-cell mobility are applicable to the following scenarios:
     - Standalone, CA and NR-DC case with serving cell change within one CG
     - Intra-CU case and intra-CU inter-DU case (applicable for Standalone and CA)
     - Both intra-frequency and inter-frequency
     - Both FR1 and FR2

Reconfiguration with sync (e.g., handover) and SCell addition are introduced in 3GPP specification 38.331 v16.6.0, one or more parts of which are quoted below:

3.1 Definitions

Primary Cell: The MCG cell, operating on the primary frequency, in which the UE either performs the initial connection establishment procedure or initiates the connection re-establishment procedure.

Primary SCG Cell: For dual connectivity operation, the SCG cell in which the UE performs random access when performing the Reconfiguration with Sync procedure.

Secondary Cell: For a UE configured with CA, a cell providing additional radio resources on top of Special Cell.

Secondary Cell Group: For a UE configured with dual connectivity, the subset of serving cells comprising of the PSCell and zero or more secondary cells.

Serving Cell: For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.

Special Cell: For Dual Connectivity operation the term Special Cell refers to the PCell of the MCG or the PSCell of the SCG, otherwise the term Special Cell refers to the PCell.

5.3.5.5 Cell Group configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig IE:

1> if the CellGroupConfig contains the spCellConfig with reconfigurationWithSync:
  2> perform Reconfiguration with sync according to 5.3.5.5.2;
  2> resume all suspended radio bearers except the SRBs for the source cell group, and resume SCG transmission for all radio bearers, and resume BH RLC channels and resume SCG transmission for BH RLC channels for IAB-MT, if suspended;
1> if the CellGroupConfig contains the rlc-BearerToReleaseList:
  2> perform RLC bearer release as specified in 5.3.5.5.3;

-continued

1> if the CellGroupConfig contains the rlc-BearerToAddModList:
2> perform the RLC bearer addition/modification as specified in 5.3.5.5.4;
1> if the CellGroupConfig contains the mac-CellGroupConfig:
2> configure the MAC entity of this cell group as specified in 5.3.5.5.5;
1> if the CellGroupConfig contains the sCellToReleaseList:
2> perform SCell release as specified in 5.3.5.5.8;
1> if the CellGroupConfig contains the spCellConfig:
2> configure the SpCell as specified in 5.3.5.5.7;
1> if the CellGroupConfig contains the sCellToAddModList:
2> perform SCell addition/modification as specified in 5.3.5.5.9;
1> if the CellGroupConfig contains the bh-RLC-ChannelToReleaseList:
2> perform BH RLC channel release as specified in 5.3.5.5.10;
1> if the CellGroupConfig contains the bh-RLC-ChannelToAddModList:
2> perform the BH RLC channel addition/modification as specified in 5.3.5.5.11;

5.3.5.5.2 Reconfiguration with Sync

The UE shall perform the following actions to execute a reconfiguration with sync.

1> if the AS security is not activated, perform the actions upon going to RRC_IDLE as specified in 5.3.11 with the release cause 'other' upon which the procedure ends;
1> if no DAPS bearer is configured:
2> stop timer T310 for the corresponding SpCell, if running;
1> if this procedure is executed for the MCG:
2> if timer T316 is running;
3> stop timer T316;
3> clear the information included in VarRLF-Report, if any;
2> resume MCG transmission, if suspended.
1> stop timer T312 for the corresponding SpCell, if running;
1> start timer T304 for the corresponding SpCell with the timer value set to t304, as included in the reconfigurationWithSync;
1> if the frequencyInfoDL is included:
2> consider the target SpCell to be one on the SSB frequency indicated by the frequencyInfoDL with a physical cell identity indicated by the physCellId;
1> else:
2> consider the target SpCell to be one on the SSB frequency of the source SpCell with a physical cell identity indicated by the physCellId;
1> start synchronising to the DL of the target SpCell;
1> apply the specified BCCH configuration defined in 9.1.1.1 for the target SpCell;
1> acquire the MIB of the target SpCell, which is scheduled as specified in TS 38.213 [13];
NOTE 1: The UE should perform the reconfiguration with sync as soon as possible following the reception of the RRC message triggering the reconfiguration with sync, which could be before confirming successful reception (HARQ and ARQ) of this message.
NOTE 2: The UE may omit reading the MIB if the UE already has the required timing information, or the timing information is not needed for random access.
NOTE 2a: A UE with DAPS bearer does not monitor for system information updates in the source PCell.
1> If any DAPS bearer is configured:
2> create a MAC entity for the target cell group with the same configuration as the MAC entity for the source cell group;
2> for each DAPS bearer:
3> establish an RLC entity or entities for the target cell group, with the same configurations as for the source cell group;
3> establish the logical channel for the target cell group, with the same configurations as for the source cell group;
NOTE 2b: In order to understand if a DAPS bearer is configured, the UE needs to check the presence of the field daps-Config within the RadioBearerConfig IE received in radioBearerConfig or radioBearerConfig2.
2> for each SRB:
3> establish an RLC entity for the target cell group, with the same configurations as for the source cell group;
3> establish the logical channel for the target cell group, with the same configurations as for the source cell group;
2> suspend SRBs for the source cell group;
NOTE 3: Void
2> apply the value of the newUE-Identity as the C-RNTI in the target cell group;
2> configure lower layers for the target SpCell in accordance with the received spCellConfigCommon;
2> configure lower layers for the target SpCell in accordance with any additional fields, not covered in the previous, if included in the received reconfigurationWithSync.
1> else:
2> reset the MAC entity of this cell group;
2> consider the SCell(s) of this cell group, if configured, that are not included in the SCellToAddModList in the RRCReconfiguration message, to be in deactivated state;
2> apply the value of the newUE-Identity as the C-RNTI for this cell group;
2> configure lower layers in accordance with the received spCellConfigCommon;

-continued

```
2> configure lower layers in accordance with any additional fields, not covered in the previous, if
   included in the received reconfigurationWithSync.
```

5.3.5.5.8 SCell Release

The UE shall:

```
1> if the release is triggered by reception of the sCellToReleaseList:
  2> for each sCellIndex value included in the sCellToReleaseList:
    3> if the current UE configuration includes an SCell
    with value sCellIndex:
      4> release the SCell.
```

5.3.5.5.9 SCell Addition/Modification

The UE shall:

```
1> for each sCellIndex value included in the sCellToAddModList that is not part of the current UE
  configuration (SCell addition):
  2> add the SCell, corresponding to the sCellIndex, in accordance with the sCellConfigCommon and
    sCellConfigDedicated;
  2> if the sCellState is included:
    3> configure lower layers to consider the SCell to be in activated state;
  2> else:
    3> configure lower layers to consider the SCell to be in deactivated state;
  2> for each measId included in the measIdList within VarMeasConfig;
    3> if SCells are not applicable for the associated measurement; and
    3> if the concerned SCell is included in cellsTriggeredList defined within the
      VarMeasReportList for this measId;
      4> remove the concerned SCell from cellsTriggeredList defined within the
        VarMeasReportList for this measId;
1> for each sCellIndex value included in the sCellToAddModList that is part of the current UE
  configuration (SCell modification):
  2> modify the SCell configuration in accordance with the sCellConfigDedicated;
  2> if the sCellToAddModList was received in an RRCReconfiguration message including
    reconfigurationWithSync, or received in an RRCResume message, or received in an
    RRCReconfiguration message including reconfigurationWithSync embedded in an RRCResume
    message or embedded in an RRCReconfiguration message or embedded in an E-UTRA
    RRCConnectionReconfiguration message or embedded in an E-UTRA RRCConnectionResume
    message:
    3> if the sCellState is included:
      4> configure lower layers to consider the SCell to be in activated state;
    3> else:
      4> configure lower layers to consider the SCell to be in deactivated state.
```

Cell group configuration, Serving Cell configuration and/or Timing Advance Group (TAG) configuration are introduced in 3GPP specification 38.331 v16.6.0, one or more parts of which are quoted below:

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

CellGroupConfig information element

```
-- Configuration of one Cell-Group:
CellGroupConfig ::=                                         SEQUENCE {
  cellGroupId                                                  CellGroupId,
  rlc-BearerToAddModList                                       SEQUENCE
(SIZE(1..maxLC-ID)) OF RLC-BearerConfig
OPTIONAL,    -- Need N
  rlc-BearerToReleaseList                                      SEQUENCE
(SIZE(1..maxLC-ID)) OF LogicalChannelIdentity
OPTIONAL,    -- Need N
  mac-CellGroupConfig                                          MAC-CellGroupConfig
OPTIONAL,    -- Need M
  physicalCellGroupConfig                                      PhysicalCellGroupConfig
```

-continued

CellGroupConfig information element

```
OPTIONAL,    -- Need M
  spCellConfig                                              SpCellConfig
OPTIONAL,    -- Need M
  sCellToAddModList                                         SEQUENCE (SIZE
(1..maxNrofSCells)) OF SCellConfig                               OPTIONAL,    -
- Need N
  sCellToReleaseList                                        SEQUENCE (SIZE
(1..maxNrofSCells)) OF SCellIndex                                OPTIONAL,    -
- Need N
  ...,
  [[
  reportUplinkTxDirectCurrent                               ENUMERATED {true}
OPTIONAL    -- Cond BWP-Reconfig
  ]],
  [[
  simultaneousTCI-UpdateListl-r16                           SEQUENCE (SIZE
(1..maxNrofServingCellsTCI-r16) ) OF ServCellIndex               OPTIONAL,    -
- Need R
  simultaneousTCI-UpdateList2-r16                           SEQUENCE (SIZE
(1..maxNrofServingCellsTCI-r16)) OF ServCellIndex                OPTIONAL,    -
- Need R
  simultaneousSpatial-UpdatedList1-r16                      SEQUENCE (SIZE
(1..maxNrofServingCellsTCI-r16)) OF ServCellIndex                OPTIONAL,    -
- Need R
  simultaneousSpatial-UpdatedList2-r16                      SEQUENCE (SIZE
(1..maxNrofServingCellsTCI-r16)) OF ServCellIndex                OPTIONAL,    -
- Need R
  uplinkTxSwitchingOption-r16                               ENUMERATED {switchedUL,
dualUL}                                                        OPTIONAL,    -- Need R
  uplinkTxSwitchingPowerBoosting-r16                        ENUMERATED {enabled}
OPTIONAL    -- Need R
  ]],
  [[
  reportUplinkTxDirectCurrentTwoCarrier-r16                 ENUMERATED {true}
OPTIONAL    -- Need N
  ]]
}
-- Serving cell specific MAC and PHY parameters for a SpCell:
SpCellConfig ::=                                        SEQUENCE {
  servCellIndex                                         ServCellIndex
OPTIONAL,    -- Cond SCG
  reconfigurationWithSync                               ReconfigurationWithSync
OPTIONAL,    -- Cond ReconfWithSync
  rlf-TimersAndConstants                                SetupRelease { RLF-
TimersAndConstants }                                      OPTIONAL,    -- Need M
  rlmInSyncOutOfSyncThreshold                           ENUMERATED {n1}
OPTIONAL,    -- Need S
  spCellConfigDedicated                                 ServingCellConfig
OPTIONAL,    -- Need M
  ...
}
ReconfigurationWithSync ::=                           SEQUENCE {
  spCellConfigCommon                                    ServingCellConfigCommon
OPTIONAL,    -- Need M
  newUE-Identity                                        RNTI-Value,
  t304                                                  ENUMERATED {ms50, ms100,
ms150, ms200, ms500, ms1000, ms2000, ms10000},
  rach-ConfigDedicated                                  CHOICE {
    uplink                                                  RACH-ConfigDedicated,
    supplementaryUplink                                     RACH-ConfigDedicated
  }
OPTIONAL,    -- Need N
  ... ,
  [[
  smtc                                                  SSB-MTC
OPTIONAL    -- Need S
  ]],
}
SCellConfig ::=                                       SEQUENCE {
  sCellIndex                                            SCellIndex,
  sCellConfigCommon                                     ServingCellConfigCommon
OPTIONAL,    -- Cond SCellAdd
  sCellConfigDedicated                                  ServingCellConfig
OPTIONAL,    -- Cond SCellAddMod
  ... ,
```

-continued

| CellGroupConfig information element | |
| --- | --- |
| [[ | |
| smtc | SSB-MTC |
| OPTIONAL -- Need S | |
| ]], | |
| [[ | |
| sCellState-r16 | ENUMERATED {activated} |
| OPTIONAL, -- Cond SCellAddSync | |
| secondaryDRX-GroupConfig-r16 | ENUMERATED {true} |
| OPTIONAL -- Cond DRX-Config2 | |
| ]]} | |
| -- TAG-CELLGROUPCONFIG-STOP | |
| -- ASN1STOP | |

| CellGroupConfig field descriptions |
| --- |
| mac-CellGroupConfig<br>MAC parameters applicable for the entire cell group. |
| rlc-BearerToAddModList<br>Configuration of the MAC Logical Channel, the corresponding RLC entities and association with radio bearers. |
| reportUplinkTxDirectCurrent<br>Enables reporting of uplink and supplementary uplink Direct Current location information upon BWP configuration and reconfiguration. This field is only present when the BWP configuration is modified or any serving cell is added or removed. This field is absent in the IE CellGroupConfig when provided as part of RRCSetup message. If UE is configured with SUL carrier, UE reports both UL and SUL Direct Current locations. |
| reportUplinkTxDirectCurrentTwoCarrier<br>Enables reporting of uplink Direct Current location information when the UE is configured with uplink intra-band CA with two carriers. This field is absent in the IE CellGroupConfig when provided as part of RRCSetup message. |
| rlmInSyncOutOfSyncThreshold<br>BLER threshold pair index for IS/OOS indication generation, see TS 38.133 [14], table 8.1.1-1. n1 corresponds to the value 1. When the field is absent, the UE applies the value 0. Whenever this is reconfigured, UE resets N310 and N311, and stops T310, if running. Network does not include this field. |
| sCellState<br>Indicates whether the SCell shall be considered to be in activated state upon SCell configuration. |
| sCellToAddModList<br>List of secondary serving cells (SCells) to be added or modified. |
| sCellToReleaseList<br>List of secondary serving cells (SCells) to be released. |
| secondaryDRX-GroupConfig<br>The field is used to indicate whether the SCell belongs to the secondary DRX group. All serving cells in the secondary DRX group shall belong to one Frequency Range and all serving cells in the legacy DRX group shall belong to another Frequency Range. |
| simultaneousTCI-UpdateList1, simultaneousTCI-UpdateList2<br>List of serving cells which can be updated simultaneously for TCI relation with a MAC CE. The simultaneousTCI-UpdateList1 and simultaneousTCI-UpdateList2 shall not contain same serving cells. Network should not configure serving cells that are configured with a BWP with two different values for the coresetPoolIndex in these lists. |
| simultaneousSpatial-UpdatedList1, simultaneousSpatial-UpdatedList2<br>List of serving cells which can be updated simultaneously for spatial relation with a MAC CE. The simultaneousSpatial-UpdatedList1 and simultaneousSpatial-UpdatedList2 shall not contain same serving cells. Network should not configure serving cells that are configured with a BWP with two different values for the coresetPoolIndex in these lists. |
| spCellConfig<br>Parameters for the SpCell of this cell group (PCell of MCG or PSCell of SCG). |
| uplinkTxSwitchingOption<br>Indicates which option is configured for dynamic UL Tx switching for inter-band UL CA or (NG)EN-DC. The field is set to switchedUL if network configures option 1 as specified in TS 38.214 [19], or dualUL if network configures option 2 as specified in TS 38.214 [19]. Network always configures UE with a value for this field in inter-band UL CA case and (NG)EN-DC case where UE supports dynamic UL Tx switching. |
| uplinkTxSwitchingPowerBoosting<br>Indicates whether the UE is allowed to enable 3 dB boosting on the maximum output power for transmission on carrier2 under the operation state in which 2-port transmission can be supported on carrier2 for inter-band UL CA case with dynamic UL Tx switching as defined in TS 38.101-1 [15]. Network can only configure this field for dynamic UL Tx switching in inter-band UL CA case with power Class 3 as defined in TS 38.101-1 [15]. |

-continued

| ReconfigurationWithSync field descriptions |
| --- |
| rach-ConfigDedicated<br>Random access configuration to be used for the reconfiguration with sync (e.g. handover). The UE performs the RA according to these parameters in the firstActiveUplinkBWP (see UplinkConfig).<br>smtc<br>The SSB periodicity/offset/duration configuration of target cell for NR PSCell change and NR PCell change. The network sets the periodicityAndOffset to indicate the same periodicity as ssb-periodicityServingCell in spCellConfigCommon.<br>For case of NR PCell change, the smtc is based on the timing reference of (source) PCell. For case of NR PSCell change, it is based on the timing reference of source PSCell.<br>If both this field and targetCellSMTC-SCG are absent, the UE uses the SMTC in the measObjectNR having the same SSB frequency and subcarrier spacing, as configured before the reception of the RRC message. |

| SCellConfig field descriptions |
| --- |
| smtc<br>The SSB periodicity/offset/duration configuration of target cell for NR SCell addition. The network sets the periodicityAndOffset to indicate the same periodicity as ssb-periodicityServingCell in sCellConfigCommon. The smtc is based on the timing of the SpCell of associated cell group. In case of inter-RAT handover to NR, the timing reference is the NR PCell. In case of intra-NR PCell change (standalone NR) or NR PSCell change (EN-DC), the timing reference is the target SpCell. If the field is absent, the UE uses the SMTC in the measObjectNR having the same SSB frequency and subcarrier spacing, as configured before the reception of the RRC message. |

| SpCellConfig field descriptions |
| --- |
| reconfigurationWithSync<br>Parameters for the synchronous reconfiguration to the target SpCell.<br>rlf-TimersAndConstants<br>Timers and constants for detecting and triggering cell-level radio link failure. For the SCG, rlf-TimersAndConstants can only be set to setup and is always included at SCG addition.<br>servCellIndex<br>Serving cell ID of a PSCell. The PCell of the Master Cell Group uses ID = 0. |

| Conditional Presence | Explanation |
| --- | --- |
| BWP-Reconfig | The field is optionally present, Need N, if the BWPs are reconfigured or if serving cells are added or removed. Otherwise it is absent. |
| DRX-Config2 | The field is optionally present, Need N, if drx-ConfigSecondaryGroup is configured. It is absent otherwise. |
| ReconfWithSync | The field is mandatory present in the RRCReconfiguration message:<br>in each configured CellGroupConfig for which the SpCell changes,<br>in the masterCellGroup:<br>at change of AS security key derived from $K_{gNB}$,<br>in an RRCReconfiguration message contained in a DLInformation TransferMRDC message,<br>in the secondaryCellGroup at:<br>PSCell addition,<br>SCG resume with NR-DC or (NG)EN-DC,<br>update of required SI for PSCell,<br>change of AS security key derived from S-$K_{gNB}$ in NR-DC while the UE is configured with at least one radio bearer with keyToUse set to secondary and that is not released by this RRCReconfiguration message,<br>MN handover in (NG)EN-DC.<br>Otherwise, it is optionally present, need M. The field is absent in the masterCellGroup in RRCResume and RRCSetup messages and is absent in the masterCellGroup in RRCReconfiguration messages if source configuration is not released during DAPS handover. |
| SCellAdd | The field is mandatory present upon SCell addition; otherwise it is absent, Need M. |
| SCellAddMod | The field is mandatory present upon SCell addition; otherwise it is optionally present, need M. |
| SCellAddSync | The field is optionally present, Need N, in case of SCell addition, reconfiguration with sync, and resuming an RRC connection. It is absent otherwise. |
| SCG | The field is mandatory present in an SpCellConfig for the PSCell. It is absent otherwise. |

MAC-CellGroupConfig

The IE MAC-CellGroupConfig is used to configure MAC parameters for a cell group, including DRX.

MAC-CellGroupConfig information element

```
MAC-CellGroupConfig :: =                    SEQUENCE {
  drx-Config                                  SetupRelease { DRX-Config }
OPTIONAL,    -- Need M
  schedulingRequestConfig                     SchedulingRequestConfig
OPTIONAL,    -- Need M
  bsr-Config                                  BSR-Config
OPTIONAL,    -- Need M
  tag-Config                                  TAG-Config
OPTIONAL,    -- Need M
  phr-Config                                  SetupRelease { PHR-Config }
OPTIONAL,    -- Need M
  skipUplinkTxDynamic                         BOOLEAN,
  ... ,
  [[
  csi-Mask                                    BOOLEAN
OPTIONAL,    -- Need M
  dataInactivityTimer                         SetupRelease {
DataInactivityTimer }                           OPTIONAL    -- Cond
MCG-Only
  ]],
  [[
  usePreBSR-r16                               ENUMERATED {true}
OPTIONAL,    -- Need R
  schedulingRequestID-LBT-SCell-r16           SchedulingRequestId
OPTIONAL,    -- Need R
  lch-BasedPrioritization-r16                 ENUMERATED {enabled}
OPTIONAL,    -- Need R
  schedulingRequestID-BFR-SCell-r16           SchedulingRequestId
OPTIONAL,    -- Need R
  drx-ConfigSecondaryGroup-r16                SetupRelease { DRX-
ConfigSecondaryGroup }                          OPTIONAL    -- Need M
  ]],
  [[
  enhancedSkipUplinkTxDynamic-r16             ENUMERATED {true}
OPTIONAL,    -- Need R
  enhancedSkipUplinkTxConfigured-r16          ENUMERATED {true}
OPTIONAL    -- Need R
  ]]
}
DataInactivityTimer ::=                     ENUMERATED {s1, s2, s3, s5, s7, s10,
s15, s20, s40, s50, s60, s80, s100, s120, s150, s180}
```

| MAC-CellGroupConfig field descriptions |
|---|
| drx-Config<br>Used to configure DRX as specified in TS 38.321 [3]. |
| drx-ConfigSecondaryGroup<br>Used to configure DRX related parameters for the second DRX group as specified in TS 38.321 [3]. The network does not configure secondary DRX group with DCP simultaneously nor secondary DRX group with a dormant BWP simultaneously. |
| lch-BasedPrioritization<br>If this field is present, the corresponding MAC entity of the UE is configured with prioritization between overlapping grants and between scheduling request and overlapping grants based on LCH priority, see TS 38.321 [3]. |
| schedulingRequestID-BFR-SCell<br>Indicates the scheduling request configuration applicable for BFR on SCell, as specified in TS 38.321 [3]. |
| schedulingRequestID-LBT-SCell<br>Indicates the scheduling request configuration applicable for consistent uplink LBT recovery on SCell, as specified in TS 38.321 [3]. |
| skipUplinkTxDynamic, enhancedSkipUplinkTxDynamic, enhancedSkipUplinkTxConfigured<br>If set to true, the UE skips UL transmissions as described in TS 38.321 [3]. If the UE is configured with enhancedSkipUplinkTxDynamic or enhancedSkipUplinkTxConfigured with value true, REPETITION_NUMBER (as specified in TS 38.321 [3], clause 5.4.2.1) of the corresponding PUSCH transmission of the uplink grant shall be equal to 1. |
| tag-Config<br>The field is used to configure parameters for a time-alignment group. The field is not present if any DAPS bearer is configured. |

—CellGroupId

The IE CellGroupId is used to identify a cell group. Value 0 identifies the master cell group. Other values identify secondary cell groups. In this version of the specification only values 0 and 1 are supported.

| CellGroupId information element |
| --- |
| CellGroupId ::= INTEGER (0.. maxSecondaryCellGroups) |

—CellIdentity

The IE CellIdentity is used to unambiguously identify a cell within a PLMN/SNPN.

| CellIdentity information element |
| --- |
| CellIdentity ::= BIT STRING (SIZE (36)) |

—ServCellIndex

The IE ServCellIndex concerns a short identity, used to uniquely identify a serving cell (i.e. the PCell, the PSCell or an SCell) across the cell groups. Value 0 applies for the PCell, while the SCellIndex that has previously been assigned applies for SCells.

| ServCellIndex information element |
| --- |
| ServCellIndex ::= INTEGER (0..maxNrofServingCells−1) |

—ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

ServingCellConfig information element

```
ServingCellConfig ::=                          SEQUENCE {
   tdd-UL-DL-ConfigurationDedicated              TDD-UL-DL-ConfigDedicated
OPTIONAL,    -- Cond TDD
   initialDownlinkBWP                            BWP-DownlinkDedicated
OPTIONAL,    -- Need M
   downlinkBWP-ToReleaseList                     SEQUENCE (SIZE
(1..maxNrofBWPs)) OF BWP-Id                              OPTIONAL,
-- Need N
   downlinkBWP-ToAddModList                      SEQUENCE (SIZE
(1..maxNrofBWPs)) OF BWP-Downlink                        OPTIONAL,
-- Need N
   firstActiveDownlinkBWP-Id                     BWP-Id
OPTIONAL,    -- Cond SyncAndCellAdd
   bwp-InactivityTimer                           ENUMERATED {ms2, ms3, ms4,
ms5, ms6, ms8, ms10, ms20, ms30,
                                                          ms40, ms50, ms60,
ms80, ms100, ms200, ms300, ms500,
                                                          ms750, ms1280,
ms1920, ms2560, spare10, spare9, spare8
                                                          spare7, spare6,
spare5, spare4, spare3, spare2, spare1 }             OPTIONAL,    --Need R
   defaultDownlinkBWP-Id                         BWP-Id
OPTIONAL,    -- Need S
   uplinkConfig                                  UplinkConfig
OPTIONAL,    -- Need M
   supplementaryUplink                           UplinkConfig
OPTIONAL,    -- Need M
   pdcch-ServingCellConfig                       SetupRelease { PDCCH-
ServingCellConfig }                                  OPTIONAL,    -- Need
M
   pdsch-ServingCellConfig                       SetupRelease { PDSCH-
ServingCellConfig }                                  OPTIONAL,    -- Need
M
   csi-MeasConfig                                SetupRelease { CSI-MeasConfig
}                                                  OPTIONAL,    -- Need M
   sCellDeactivationTimer                        ENUMERATED {ms20, ms40, ms80,
ms160, ms200, ms240,
                                                          ms320, ms400,
ms480, ms520, ms640, ms720,
                                                          ms840, ms1280,
spare2, spare1}        OPTIONAL,           -- Cond ServingCellWithoutPUCCH
   tag-Id                                        TAG-Id,
UplinkConfig ::=                               SEQUENCE {
   initialUplinkBWP                              BWP-UplinkDedicated
OPTIONAL,    -- Need M
   uplinkBWP-ToReleaseList                       SEQUENCE (SIZE
(1 . . . maxNrofBWPs)) OF BWP-Id                         OPTIONAL,    -
- Need N
   uplinkBWP-ToAddModList                        SEQUENCE (SIZE
(1.. maxNrofBWPs)) OF BWP-Uplink                         OPTIONAL,    -
- Need N
   firstActiveUplinkBWP-Id                       BWP-Id
```

-continued

ServingCellConfig information element

```
OPTIONAL,     -- Cond SyncAndCellAdd
   pusch-ServingCellConfig                          SetupRelease { PUSCH-
ServingCellConfig }                                         OPTIONAL,    -- Need
M
   carrierswitching                                 SetupRelease { SRS-
Carrierswitching }                                          OPTIONAL,    --
Need M
   ...,
}
```

| ServingCellConfig field descriptions |
|---|
| bwp-InactivityTimer<br>The duration in ms after which the UE falls back to the default Bandwidth Part (see TS 38.321 [3], clause 5.15). When the network releases the timer configuration, the UE stops the timer without switching to the default BWP. |
| dormantBWP-Config<br>The dormant BWP configuration for an SCell. This field can be configured only for a (non-PUCCH) SCell. |
| downlinkBWP-ToAddModList<br>List of additional downlink bandwidth parts to be added or modified, (see TS 38.213 [13], clause 12). |
| downlinkBWP-ToReleaseList<br>List of additional downlink bandwidth parts to be released, (see TS 38.213 [13], clause 12). |
| downlinkChannelBW-PerSCS-List<br>A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in scs-SpecificCarrierList in DownlinkConfigCommon / DownlinkConfigCommonSIB. Network only configures channel bandwidth that corresponds to the channel bandwidth values defined in TS 38.101-1 [15] and TS 38.101-2 [39]. |
| firstActiveDownlinkBWP-Id<br>If configured for an SpCell, this field contains the ID of the DL BWP to be activated upon performing the RRC (re-)configuration. If the field is absent, the RRC (re-)configuration does not impose a BWP switch.<br>If configured for an SCell, this field contains the ID of the downlink bandwidth part to be used upon activation of an SCell. The initial bandwidth part is referred to by BWP-Id = 0.<br>Upon reconfiguration with reconfigurationWithSync, the network sets the firstActiveDownlinkBWP-Id and firstActiveUplinkBWP-Id to the same value. |
| initialDownlinkBWP<br>The dedicated (UE-specific) configuration for the initial downlink bandwidth-part (i.e. DL BWP#0). If any of the optional IEs are configured within this IE, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1 |
| tag-Id<br>Timing Advance Group ID, as specified in TS 38.321 [3], which this cell belongs to. |
| uplinkConfig<br>Network may configure this field only when uplinkConfigCommon is configured in ServingCellConfigCommon or ServingCellConfigCommonSIB. Addition or release of this field can only be done upon SCell addition or release (respectively). |

TAG-Config

The IE TAG-Config is used to configure parameters for a time-alignment group.

TAG-Config information element

```
TAG-Config ::=                  SEQUENCE {
   tag-ToReleaseList                         SEQUENCE (SIZE
(1..maxNrofTAGs)) OF TAG-Id                          OPTIONAL,    --
Need N
   tag-ToAddModList                          SEQUENCE (SIZE
(1..maxNrofTAGs)) OF TAG                             OPTIONAL     --
Need N
}
```

-continued

TAG-Config information element

```
TAG ::=                         SEQUENCE {
   tag-id                                    TAG-Id,
   timeAlignmentTimer                        TimeAlignmentTimer,
   ...
}
TAG-Id ::=                      INTEGER (0..maxNrofTAGs−1)
TimeAlignmentTimer ::=          ENUMERATED {ms500, ms750, ms1280,
ms1920, ms2560, ms5120, ms10240, infinity}
```

| TAG field descriptions |
| --- |
| tag-Id<br>Indicates the TAG of the SpCell or an SCell, see TS 38.321 [3]. Uniquely identifies the TAG within the scope of a Cell Group (i.e. MCG or SCG).<br>timeAlignmentTimer<br>Value in ms of the timeAlignmentTimer for TAG with ID tag-Id, as specified in TS 38.321 [3]. |

Random access procedure, timing advance and/or time alignment are introduced in 3GPP specification 38.321 v16.6.0, one or more parts of which are quoted below:

Timing Advance Group: A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

5.1 Random Access Procedure 5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

NOTE 1: If a new Random Access procedure is triggered while another is already ongoing in the MAC entity, it is up to UE implementation whether to continue with the ongoing procedure or start with the new procedure (e.g. for SI request).

NOTE 2: If there was an ongoing Random Access procedure that is triggered by a PDCCH order while the UE receives another PDCCH order indicating the same Random Access Preamble, PRACH mask index and uplink carrier, the Random Access procedure is considered as the same Random Access procedure as the ongoing one and not initialized again.

When the Random Access procedure is initiated on a Serving Cell, the MAC entity shall:

1> flush the Msg3 buffer;
1> flush the MSGA buffer;
1> set the PREAMBLE_TRANSMISSION-COUNTER to 1;
1> set the PREAMBLE_POWER_RAMPING_COUNTER to 1;
1> set the PREAMBLE_BACKOFF to 0 ms;
1> set P0WER_OFFSET_2STEP_RA to 0 dB;
1> if the carrier to use for the Random Access procedure is explicitly signalled:
  2> select the signalled carrier for performing Random Access procedure;
  2> set the PCMAX to $P_{CMAX,f,c}$ of the signalled carrier.
1> else if the carrier to use for the Random Access procedure is not explicitly signalled; and
1> if the Serving Cell for the Random Access procedure is configured with supplementary uplink as specified in TS 38.331 [5]; and
1> if the RSRP of the downlink pathloss reference is less than rsrp-ThresholdSSB-SUL:
  2> select the SUL carrier for performing Random Access procedure;
  2> set the PCMAX to $P_{CMAX,f,c}$ of the SUL carrier.
1> else:
  2> select the NUL carrier for performing Random Access procedure;
  2> set the PCMAX to $P_{CMAX,f,c}$ of the NUL carrier.
1> perform the BWP operation as specified in clause 5.15;
1> if the Random Access procedure is initiated by PDCCH order and if the ra-PreambleIndex explicitly provided by PDCCH is not 0b000000; or
1> if the Random Access procedure was initiated for SI request (as specified in TS 38.331 [5]) and the Random Access Resources for SI request have been explicitly provided by RRC; or
1> if the Random Access procedure was initiated for SpCell beam failure recovery (as specified in clause 5.17) and if the contention-free Random Access Resources for beam failure recovery request for 4-step RA type have been explicitly provided by RRC for the BWP selected for Random Access procedure; or
1> if the Random Access procedure was initiated for reconfiguration with sync and if the contention-free Random Access Resources for 4-step RA type have been explicitly provided in rach-ConfigDedicated for the BWP selected for Random Access procedure:
  2> set the RA_TYPE to 4-stepRA.
1> else if the BWP selected for Random Access procedure is configured with both 2-step and 4-step RA type Random Access Resources and the RSRP of the downlink pathloss reference is above msgA-RSRP-Threshold; or
1> if the BWP selected for Random Access procedure is only configured with 2-step RA type Random Access resources (i.e. no 4-step RACH RA type resources configured); or
1> if the Random Access procedure was initiated for reconfiguration with sync and if the contention-free Random Access Resources for 2-step RA type have been explicitly provided in rach-ConfigDedicated for the BWP selected for Random Access procedure:
  2> set the RA_TYPE to 2-stepRA.

-continued

```
1> else:
  2> set the RA_TYPE to 4-stepRA.
1> perform initialization of variables specific to Random Access type as specified in clause 5.1.1a;
1> if RA_TYPE is set to 2-stepRA:
  2> perform the Random Access Resource selection procedure for 2-step RA type (see clause 5.1.2a).
1> else:
  2> perform the Random Access Resource selection procedure (see clause 5.1.2)
```

5.1.2 Random Access Resource selection

If the selected RA_TYPE is set to 4-stepRA, the MAC entity shall:

```
1> if the Random Access procedure was initiated for SpCell beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
  2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
  2> if CSI-RS is selected, and there is no ra-PreambleIndex associated with the selected CSI-RS:
    3> set the PREAMBLE_INDEX to a ra-PreambleIndex corresponding to the SSB in candidateBeamRSList which is quasi-colocated with the selected CSI-RS as specified in TS 38.214 [7].
  2> else:
    3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
  2> set the PREAMBLE_INDEX to the signalled ra-PreambleIndex;
  2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
  2> select an SSB with SS-RSRP above rsrp-ThresholdSSB amongst the associated SSBs;
  2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
  2> select a CSI-RS with CSI-RSRP above rsrp-ThresholdCSI-RS amongst the associated CSI-RSs;
  2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> select a Random Access Preamble corresponding to the selected SSB, from the Random Access Preamble(s) determined according to ra-PreambleStartIndex as specified in TS 38.331 [5];
  2> set the PREAMBLE_INDEX to selected Random Access Preamble.
1> else (i.e. for the contention-based Random Access preamble selection):
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> if the RA_TYPE is switched from 2-stepRA to 4-stepRA;
    3> if a Random Access Preambles group was selected during the current Random Access procedure:
      4> select the same group of Random Access Preambles as was selected for the 2-step RA type.
    3> else:
      4> if Random Access Preambles group B is configured; and
      4> if the transport block size of the MSGA pay load configured in the rach-ConfigDedicated corresponds to the transport block size of the MSGA payload associated with Random Access Preambles group B:
        5> select the Random Access Preambles group B.
      4> else:
        5> select the Random Access Preambles group A.
```

-continued

2> else if Msg3 buffer is empty:
3> if Random Access Preambles group B is configured:
4> if the potential Msg3 size (UL data available for transmission plus MAC subheader(s) and, where required, MAC CEs) is greater than ra-Msg3SizeGroupA and the pathloss is less than PCMAX (of the Serving Cell performing the Random Access Procedure) - preambleReceivedTargetPower - msg3-DeltaPreamble - messagePowerOffsetGroupB', or
4> if the Random Access procedure was initiated for the CCCH logical channel and the CCCH SDU size plus MAC subheader is greater than ra-Msg3SizeGroupA:
5> select the Random Access Preambles group B.
4> else:
5> select the Random Access Preambles group A.
3> else:
4> select the Random Access Preambles group A.
2> else (i.e. Msg3 is being retransmitted):
3> select the same group of Random Access Preambles as was used for the Random Access Preamble transmission attempt corresponding to the first transmission of Msg3.
2> select a Random Access Preamble randomly with equal probability from the Random Access Preambles associated with the selected SSB and the selected Random Access Preambles group;
2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
2> determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).
1> else if an SSB is selected above:
2> determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
2> if there is no contention-free Random Access Resource associated with the selected CSI-RS:
3> determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
2> else:
3> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
NOTE 1: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.
NOTE 2: Void.

5.1.3 Random Access Preamble Transmission

The MAC entity shall, for each Random Access Preamble:

1> if PREAMBLE_TRANSMISSION-COUNTER is greater than one; and
1> if the notification of suspending power ramping counter has not been received from lower layers; and
1> if LBT failure indication was not received from lower layers for the last Random Access Preamble transmission; and
1> if SSB or CSI-RS selected is not changed from the selection in the last Random Access Preamble transmission:
2> increment PREAMBLE_POWER_RAMPING_COUNTER by 1.
1> select the value of DELTA_PREAMBLE according to clause 7.3;
1> set PREAMBLE_RECEIVED_TARGET_POWER to preambleReceivedTargetPower + DELTA_PREAMBLE + (PREAMBLE_POWER_RAMPING_COUNTER − 1) × PREAMBLE_POWER_RAMPING_STEP + POWER_OFFSET_2STEP_RA;

-continued

1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX, and PREAMBLE_RECEIVED_TARGET_POWER.

5.1.4 Random Access Response Reception

Once the Random Access Preamble is transmitted and regardless of the possible occurrence of a measurement gap, the MAC entity shall:

1> if the contention-free Random Access Preamble for beam failure recovery request was transmitted by the MAC entity:
  2> start the ra-ResponseWindow configured in BeamFailureRecoveryConfig at the first PDCCH occasion as specified in TS 38.213 [6] from the end of the Random Access Preamble transmission;
  2> monitor for a PDCCH transmission on the search space indicated by recoverySearchSpaceId of the SpCell identified by the C-RNTI while ra-ResponseWindow is running.
1> else:
  2> start the ra-ResponseWindow configured in RACH-ConfigCommon at the first PDCCH occasion as specified in TS 38.213 [6] from the end of the Random Access Preamble transmission;
  2> monitor the PDCCH of the SpCell for Random Access Response(s) identified by the RA-RNTI while the ra-ResponseWindow is running.
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
  2> consider the Random Access procedure successfully completed.
1> else if a valid (as specified in TS 38.213 [6]) downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING_FACTOR_BI.
  2> else:
    3> set the PREAMBLE_BACKOFF to 0 ms.
  2> if the Random Access Response contains a MAC subPDU with Random Access Preamble identifier corresponding to the transmitted PREAMBLE_INDEX (see clause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see clause 5.2);
        5> indicate the preambleReceivedTargetPower and the amount of power ramping applied to the latest Random Access Preamble transmission to lower layers (i.e. (PREAMBLE_POWER_RAMPING_COUNTER − 1) × PREAMBLE_POWER_RAMPING_STEP);
        5> if the Random Access procedure for an SCell is performed on uplink carrier where pusch-Config is not configured:
          6> ignore the received UL grant.
        5> else:
          6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY_C-RNTI to the value received in the Random Access Response;
        5> if this is the first successfully received Random Access Response within this Random Access procedure:
          6> if the transmission is not being made for the CCCH logical channel:
            7> indicate to the Multiplexing and assembly entity to include a C-RNTI MAC CE in the subsequent uplink transmission.
          6> if the Random Access procedure was initiated for SpCell beam failure recovery and spCell-BFR-CBRA with value true is configured:
            7> indicate to the Multiplexing and assembly entity to include a BFR MAC CE or a Truncated BFR MAC CE in the subsequent uplink transmission.
          6> obtain the MAC PDU to transmit from the Multiplexing and assembly entity and store it in the Msg3 buffer.

5.1.5 Contention Resolution

Once Msg3 is transmitted the MAC entity shall:

1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
 2> if the C-RNTI MAC CE was included in Msg3:
  3> if the Random Access procedure was initiated for SpCell beam failure recovery (as specified in clause 5.17) and the PDCCH transmission is addressed to the C-RNTI; or
  3> if the Random Access procedure was initiated by a PDCCH order and the PDCCH transmission is addressed to the C-RNTI; or
  3> if the Random Access procedure was initiated by the MAC sublayer itself or by the RRC sublayer and the PDCCH transmission is addressed to the C-RNTI and contains a UL grant for a new transmission:
   4> consider this Contention Resolution successful;
   4> stop ra-ContentionResolutionTimer;
   4> discard the TEMPORARY_C-RNTI;
   4> consider this Random Access procedure successfully completed.
 2> else if the CCCH SDU was included in Msg3 and the PDCCH transmission is addressed to its TEMPORARY_C-RNTI:
  3> if the MAC PDU is successfully decoded:
   4> stop ra-ContentionResolutionTimer;
   4> if the MAC PDU contains a UE Contention Resolution Identity MAC CE; and
   4> if the UE Contention Resolution Identity in the MAC CE matches the CCCH SDU transmitted in Msg3:
    5> consider this Contention Resolution successful and finish the disassembly and demultiplexing of the MAC PDU;
    5> if this Random Access procedure was initiated for SI request:
     6> indicate the reception of an acknowledgement for SI request to upper layers.
    5> else:
     6> set the C-RNTI to the value of the TEMPORARY_C-RNTI;
    5> discard the TEMPORARY_C-RNTI;
    5> consider this Random Access procedure successfully completed.
   4> else:
    5> discard the TEMPORARY_C-RNTI;
    5> consider this Contention Resolution not successful and discard the successfully decoded MAC PDU.
    ...

5.1.6 Completion of the Random Access procedure

Upon completion of the Random Access procedure, the MAC entity shall:

1> discard any explicitly signalled contention-free Random Access Resources for 2-step RA type and 4-step RA type except the 4-step RA type contention-free Random Access Resources for beam failure recovery request, if any;
 1> flush the HARQ buffer used for transmission of the MAC PDU in the Msg3 buffer and the MSGA buffer.
Upon successful completion of the Random Access procedure initiated for DAPS handover, the target MAC entity shall:
 1> indicate the successful completion of the Random Access procedure to the upper layers.

5.2 Maintenance of Uplink Time Alignment

RRC configures the following parameters for the maintenance of UL time alignment:

timeAlignmentTimer (per TAG) which controls how long the MAC entity considers the Serving Cells belonging to the associated TAG to be uplink time aligned.

The MAC entity shall:

1> when a Timing Advance Command MAC CE is received, and if an $N_{TA}$ (as defined in TS 38.211 [8]) has been maintained with the indicated TAG:
 2> apply the Timing Advance Command for the indicated TAG;
 2> start or restart the timeAlignmentTimer associated with the indicated TAG.
1> when a Timing Advance Command is received in a Random Access Response message for a Serving Cell belonging to a TAG or in a MSGB for an SpCell:
 2> if the Random Access Preamble was not selected by the MAC entity among the contention-based Random Access Preamble:
  3> apply the Timing Advance Command for this TAG;
  3> start or restart the timeAlignmentTimer associated with this TAG.

-continued

2> else if the timeAlignmentTimer associated with this TAG is not running:
3> apply the Timing Advance Command for this TAG;
3> start the timeAlignmentTimer associated with this TAG;
3> when the Contention Resolution is considered not successful as described in clause 5.1.5; or
3> when the Contention Resolution is considered successful for SI request as described in clause 5.1.5, after transmitting HARQ feedback for MAC PDU including UE Contention Resolution Identity MAC CE:
4> stop timeAlignmentTimer associated with this TAG.
2> else:
3> ignore the received Timing Advance Command.
1> when an Absolute Timing Advance Command is received in response to a MSGA transmission including C-RNTI MAC CE as specified in clause 5.1.4a:
2> apply the Timing Advance Command for PTAG;
2> start or restart the timeAlignmentTimer associated with PTAG.
1> when a timeAlignmentTimer expires:
2> if the timeAlignmentTimer is associated with the PTAG:
3> flush all HARQ buffers for all Serving Cells;
3> notify RRC to release PUCCH for all Serving Cells, if configured;
3> notify RRC to release SRS for all Serving Cells, if configured;
3> clear any configured downlink assignments and configured uplink grants;
3> clear any PUSCH resource for semi-persistent CSI reporting;
3> consider all running timeAlignmentTimers as expired;
3> maintan $N_{TA}$ (defined in TS 38.211 [8]) of all TAGs.
2> else if the timeAlignmentTimer is associated with an STAG, then for all Serving Cells belonging to this TAG:
3> flush all HARQ buffers;
3> notify RRC to release PUCCH, if configured;
3> notify RRC to release SRS, if configured;
3> clear any configured downlink assignments and configured uplink grants;
3> clear any PUSCH resource for semi-persistent CSI reporting;
3> maintain $N_{TA}$ (defined in TS 38.211 [8]) of this TAG.

When the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity considers the timeAlignmentTimer associated with the SCell as expired.

The MAC entity shall not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity shall not perform any uplink transmission on any Serving Cell except the Random Access Preamble and MSGA transmission on the SpCell.

5.9 Activation/Deactivation of SCells

If the MAC entity is configured with one or more SCells, the network may activate and deactivate the configured SCells. Upon configuration of an SCell, the SCell is deactivated unless the parameter sCellState is set to activated for the SCell by upper layers.

The configured SCell(s) is activated and deactivated by:

receiving the SCell Activation/Deactivation MAC CE described in clause 6.1.3.10;

configuring sCellDeactivationTimer timer per configured SCell (except the SCell configured with PUCCH, if any): the associated SCell is deactivated upon its expiry;

configuring sCellState per configured SCell: if configured, the associated SCell is activated upon SCell configuration.

The MAC entity shall for each configured SCell:

1> if an SCell is configured with sCellState set to activated upon SCell configuration, or an SCell Activation/Deactivation MAC CE is received activating the SCell:
2> if the SCell was deactivated prior to receiving this SCell Activation/Deactivation MAC CE; or
2> if the SCell is configured with sCellState set to activated upon SCell configuration:
3> if firstActiveDownlinkBWP-Id is not set to dormant BWP:
4> activate the SCell according to the timing defined in TS 38.213 [6] for MAC CE activation and according to the timing defined in TS 38.133 [11] for direct SCell activation; i.e. apply normal SCell operation including:
5> SRS transmissions on the SCell;
5> CSI reporting for the SCell;
5> PDCCH monitoring on the SCell;
5> PDCCH monitoring for the SCell;
5> PUCCH transmissions on the SCell, if configured.
3> else (i.e. firstActiveDownlinkBWP-Id is set to dormant BWP):
4> stop the bwp-InactivityTimer of this Serving Cell, if running.
3> activate the DL BWP and UL BWP indicated by firstActiveDownlinkBWP-Id and firstActiveUplinkBWP-Id respectively.

-continued

2> start or restart the sCellDeactivationTimer associated with the SCell according to the timing defined in TS 38.213 [6] for MAC CE activation and according to the timing defined in TS 38.133 [11] for direct SCell activation;
2> if the active DL BWP is not the dormant BWP:
3> (re-)initialize any suspended configured uplink grants of configured grant Type 1 associated with this SCell according to the stored configuration, if any, and to start in the symbol according to rules in clause 5.8.2;
3> trigger PHR according to clause 5.4.6.
1> else if an SCell Activation/Deactivation MAC CE is received deactivating the SCell; or
1> if the sCellDeactivationTimer associated with the activated SCell expires:
2> deactivate the SCell according to the timing defined in TS 38.213 [6];
2> stop the sCellDeactivationTimer associated with the SCell;
2> stop the bwp-InactivityTimer associated with the SCell;
2> deactivate any active BWP associated with the SCell;
2> clear any configured downlink assignment and any configured uplink grant Type 2 associated with the SCell respectively;
2> clear any PUSCH resource for semi-persistent CSI reporting associated with the SCell;
2> suspend any configured uplink grant Type 1 associated with the SCell;
2> flush all HARQ buffers associated with the SCell;
2> cancel, if any, triggered consistent LBT failure for the SCell.
1> if PDCCH on the activated SCell indicates an uplink grant or downlink assignment; or
1> if PDCCH on the Serving Cell scheduling the activated SCell indicates an uplink grant or a downlink assignment for the activated SCell; or
1> if a MAC PDU is transmitted in a configured uplink grant and LBT failure indication is not received from lower layers; or
1> if a MAC PDU is received in a configured downlink assignment:
2> restart the sCellDeactivationTimer associated with the SCell.
1> if the SCell is deactivated:
2> not transmit SRS on the SCell;
2> not report CSI for the SCell;
2> not transmit on UL-SCH on the SCell;
2> not transmit on RACH on the SCell;
2> not monitor the PDCCH on the SCell;
2> not monitor the PDCCH for the SCell;
2> not transmit PUCCH on the SCell.

HARQ feedback for the MAC PDU containing SCell Activation/Deactivation MAC CE shall not be impacted by PCell, PSCell and PUCCH SCell interruptions due to SCell activation/deactivation in TS 38.133 [11].

When SCell is deactivated, the ongoing Random Access procedure on the SCell, if any, is aborted.

Figure 5:
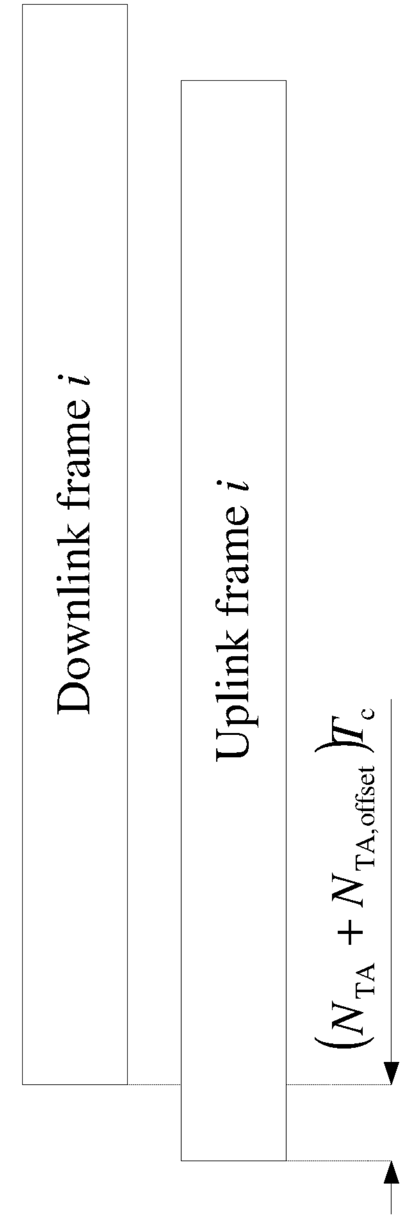
FIG. 5 is a diagram illustrating an exemplary scenario associated with uplink-downlink timing relation according to one exemplary embodiment.

3GPP specification 38.211 v16.7.0 discusses timing advance. Notably, FIG. 4.3.1-1 of Section 4.3.1 of 3GPP specification 38.211 v16.7.0, entitled "Uplink-downlink timing relation", is reproduced herein as FIG. 5. One or more parts of 3GPP specification 38.211 v16.7.0 are quoted below:

3.2 Symbols $N_{TA}$ Timing advance between downlink and uplink; see clause 4.3.1

$N_{TA,offset}$ A fixed offset used to calculate the timing advance; see clause 4.3.1

4.3 Frame Structure 4.3.1 Frames and Subframes

Downlink, uplink, and sidelink transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The number of consecutive OFDM symbols per subframe is $$N_{symb}^{subframe,\mu}=N_{symb}^{slot}N_{slot}^{subframe,\mu}.$$

Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ is given by [5, TS 38.213], except for msgA transmission on PUSCH where $N_{TA}=0$ shall be used.

FIG. 4.3.1-1: Uplink-Downlink Timing Relation 4.3.2 Slots

For subcarrier spacing configuration μ, slots are numbered $$n_s^{\mu}\in\{0,\ldots,N_{slot}^{subframe,\mu}-1\}$$

in increasing order within a subframe and $$n_{s,f}^{\mu}\in\{0,\ldots,N_{slot}^{frame,\mu}-1\}$$

in increasing order within a frame. There are $$N_{symb}^{slot}$$

consecutive OFDM symbols in a slot where $$N_{symb}^{slot}$$

depends on the cyclic prefix as given by Tables 4.3.2-1 and 4.3.2-2. The start of slot $$n_s^\mu$$

in a subframe is aligned in time with the start of OFDM symbol $$n_s^\mu N_{symb}^{slot}$$

in the same subframe.

OFDM symbols in a slot in a downlink or uplink frame can be classified as 'downlink', 'flexible', or 'uplink'. Signaling of slot formats is described in clause 11.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

In NR, a UE may perform a handover procedure to switch from one cell to another cell. The UE performs the handover procedure in response to a Radio Resource Control (RRC) signaling transmitted by a network. The RRC signaling comprises cell information of a target cell. The network determines to initiate the handover procedure based on measurement reports of the UE. Change of a Primary Cell (PCell) and/or a PSCell via reconfiguration with sync (e.g., involving Layer-3 (L3) RRC message) may involve higher latency and/or more overhead than Layer-1 (L1)/Layer-2 (L2) signaling (e.g., beam switch mobility). Alternatively and/or additionally, in operation on Frequency Range 2 (FR2), frequent Secondary Cell Group (SCG) changes will occur, which may also lead to high latency for UE-NW communication if L3 Handover is used. In the present disclosure, the term "PSCell" may refer to a Primary SCG Cell and/or a Primary Secondary Cell. Therefore, in WID on NR further mobility enhancements provided in RP-212710, an objective of the work item may be to specify a mechanism and/or procedure for dynamic switching mechanism among Serving Cells, including one or more Special Cells (SpCells) and/or one or more Secondary Cells (SCells) based on L1/L2 signaling. In the present disclosure, the term "L1/L2" may refer to L1 and/or L2.

Figure 6:
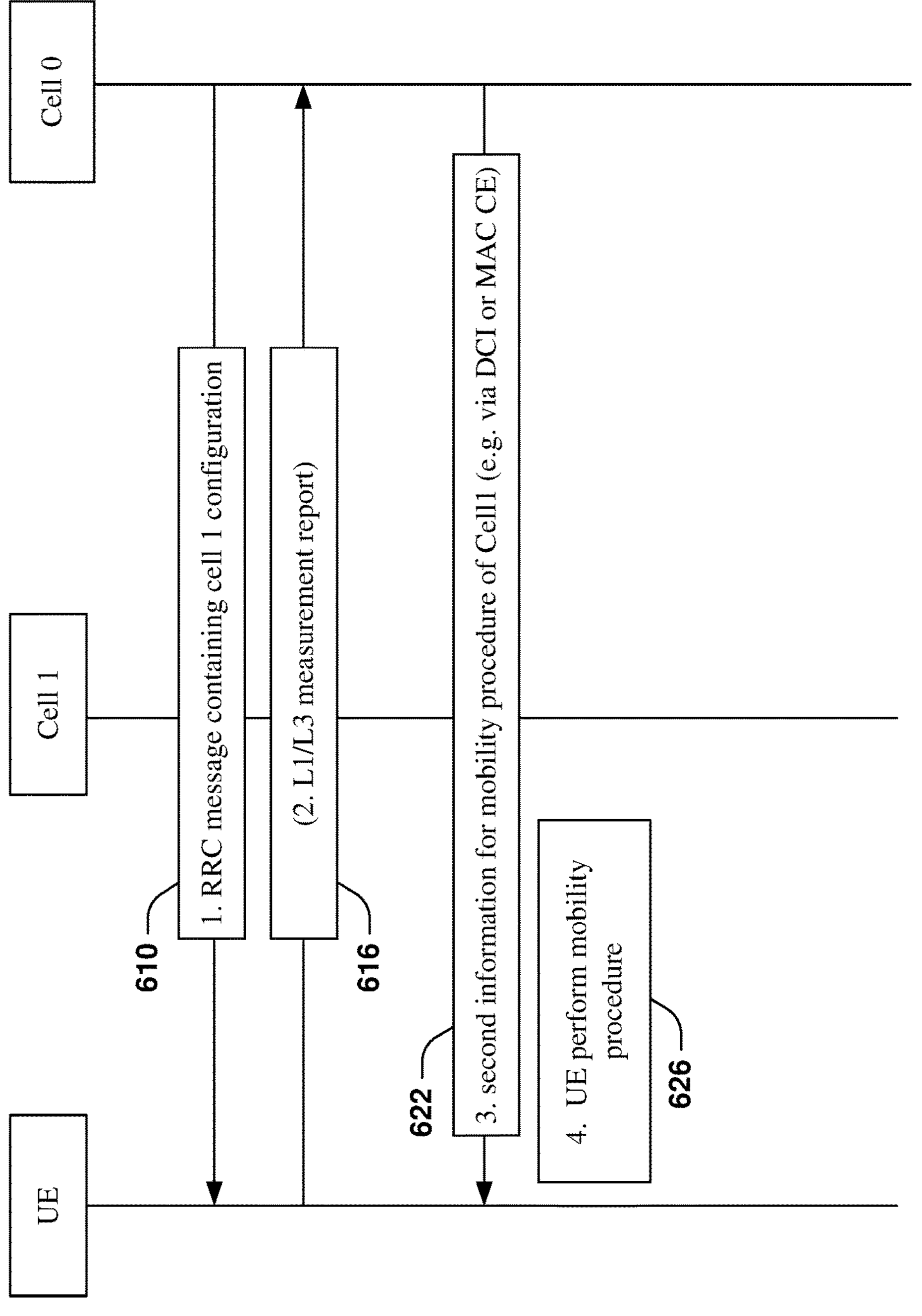
FIG. 6 is a diagram illustrating an exemplary scenario associated with a UE, a first cell, and a second cell according to one exemplary embodiment.

FIG. 6 illustrates a scenario 600 associated with a UE, a first cell "Cell 0", and a second cell "Cell 1". The UE may receive a first information 610 (e.g., a step 1 RRC message), comprising Cell 1 configuration, from Cell 0. The UE may perform RRC connection with Cell 0. The Cell 1 configuration may comprise a Serving Cell configuration of Cell 1. Cell 1 may be a neighboring cell, a SCell, or a PCell of the UE. The UE may transmit a L1/L3 measurement report 616 to Cell 0 (e.g., the L1/L3 measurement report 616 may comprise measurement associated with Cell 1). The Cell 0 may transmit a second information 622 (e.g., a step 3 Downlink Control Information (DCI) or Medium Access Control (MAC) Control Element (CE)) to the UE for initiating a mobility procedure associated with Cell 1. In response to receiving the second information 622, the UE may initiate and/or perform a mobility procedure 626 associated with Cell 1. Corresponding to various setups for the information (e.g., the first information 610 and/or the second information 622) and/or procedure (e.g., procedure), the UE may perform one or more procedures to Cell 1 (e.g., SCell addition and/or SCell release; PCell switching, etc.). The UE may consider the Cell 1 as a PCell or a SCell (in a Master Cell Group (MCG) or a SCG, for example) in response to completion of the mobility procedure (and/or in response to receiving the second information). For communicating via a cell (e.g. Cell 1), the UE may need to obtain and/or maintain a Timing Advance (TA) (and/or a time alignment) associated with the Cell 1. According to some systems and/or procedures, the UE obtains TA information (e.g. a Timing Advance Command) for a SCell of a timing advance group (TAG) in a random access response during a random access procedure initiated by a network (e.g., the random access procedure may be initiated via PDCCH order). In some examples, in a L1/L2 mobility procedure associated with adding and/or changing a SCell, there may not be a random access procedure and/or there may not be a Timing Advance command provided in a random access response. In the present disclosure, we discuss methods and procedures to achieve maintaining Time alignment for SCell and/or SCG switching in L1/L2 mobility.

A concept of the present disclosure is that a UE may receive a first information comprising one or more configurations of one or more cells. The UE may receive a second information indicating, to the UE, an index/identity associated with at least one cell of the one or more cells. In the present disclosure, the term "index/identity" may correspond to an index and/or an identity (id). The second information may not comprise (e.g., may not indicate) the one or more configurations of the one or more cells. The second information may indicate to the UE (e.g., instruct the UE) to initiate a mobility procedure (e.g., the second information may comprise signaling initiating the mobility procedure and/or may comprise information for the mobility procedure, such as information that is necessary to perform the mobility procedure). The UE may initiate a mobility procedure in response to receiving the second information. The UE may not initiate the mobility procedure in response to receiving the first information. Alternatively and/or additionally, the UE may consider a first cell (e.g., at least one cell) of the one or more cells to be a Serving Cell of the UE in response to a completion of the mobility procedure initiated in response to receiving the second information. The UE may not consider the first cell of the one or more cells to be a Serving Cell of the UE in response to receiving the first information (and/or before performing and/or completing the mobility procedure initiated in response to receiving the second information).

The first information and the second information may be transmitted in different signalings. In the present disclosure, the term "signaling" may correspond to at least one of a signal, a set of signals, a transmission, a message, etc.

The first information and the second information may be transmitted at different timings. In the present disclosure, the term "timing" may correspond to at least one of a time, a time period, a time unit, a slot, a symbol, etc.

The one or more configurations may include Serving Cell configuration.

Embodiment 1

In Embodiment 1, the first information may indicate Timing Advance information associated with SCells (e.g., the first information may indicate Timing Advance information per-TAG, per cell, etc.).

In some examples, the first information indicates Timing Advance of a set of cells (per TAG, for example). For example, the first information may indicate an existing TAG (and/or TAG id associated with the existing TAG) associated with a set of cells. For example, the first information indicates Timing Advance of a set of cells (per TAG, for example) by indicating an existing TAG (and/or by indicating a TAG id associated with the existing TAG).

The first information (received by the UE) may indicate one or more first sets of cells (e.g., CellGroupConfig). In the present disclosure, the term "set of cells" may correspond to a set of cells and/or CGs, wherein the set of cells and/or CGs may comprise one or more cells and/or one or more CGs. Each set of the one or more first sets may comprise one or more cells and/or one or more CGs. Each set of the one or more first sets may comprise a SpCell (e.g., a PCell and/or a PSCell) associated with the UE (e.g., the SpCell may be in a Master Cell Group (MCG) associated with the UE, or in a SCG associated with the UE). Each set of the one or more first sets may comprise one or more SCells associated with the UE (e.g., the one or more SCells may be in the MCG, or in the SCG). The first information may indicate cell configuration (e.g., ServingCellconfig) associated with each of the cells (e.g., for each cell of the one or more first sets, the first information may indicate a cell configuration associated with the cell). Each set of the one or more first sets may comprise one or more neighboring cells associated with the UE. Each set of the one or more first sets may comprise one or more non-serving cells of the UE (e.g., the one or more non-serving cells may correspond to one or more cells associated with one or more Physical Cell Identifiers (PCIs) different from one or more Serving Cells). Each set of the one or more first sets may be a candidate cell group or a candidate set of cells for the UE to perform mobility procedure and/or L1/L2 mobility. Alternatively and/or additionally, the first information may indicate a configuration for each set of the one or more first sets of cells (e.g., CellGroupConfig).

Each set of the one or more first sets may be associated with (e.g., may comprise and/or indicate) a TAG (e.g., a current and/or existing TAG). For example, each set of the one or more first sets may be associated with a TAG id (e.g., TAG-Id). The TAG id may be associated with a Primary Timing Advance Group (pTAG) of a MCG (of the UE, for example), a Secondary Timing Advance Group (sTAG) of a MCG (of the UE, for example), a pTAG of a SCG, or a sTAG of a SCG. The TAG id may be associated with a valid timing advance value (e.g., $N_{TA}$) associated with a pTAG or a sTAG (e.g., an existing pTAG or an existing sTAG).

In response to (and/or when) (i) initiating or completing a mobility procedure associated with adding/activating a first set of cells (e.g., a first set of one or more cells) of the one or more first sets of cells and/or (ii) receiving the second information, the UE may apply, configure, and/or set a TAG id (e.g., tag-Id) of the first set of cells based on an indication of the TAG id (in the first information, for example). In the present disclosure, the term "adding/activating" may refer to adding and/or activating. In some examples, the UE may not perform a random access procedure (to obtain a timing advance value for the first set of cells, for example) in response to (and/or after) receiving the second information if (and/or when) the first set of cells is associated with (e.g., configured with and/or indicated as being associated with) a TAG id that is the same as a TAG id of a current and/or existing TAG (e.g., a TAG that the UE is configured with and/or that is activated before and/or after receiving the second information). In response to (and/or when) (i) initiating or completing the mobility procedure and/or (ii) receiving the second information, the UE may apply a timing advance value (e.g., $N_{TA}$) associated with the current and/or existing TAG (that has the same TAG id, for example) on the first set of cells (e.g., the UE may apply the timing advance value after and/or when adding/activating the first set of cells). The UE may start (and/or restart) a timeAlignmentTimer associated with the current and/or existing TAG in response to applying the timing advance value.

Embodiment 2

In Embodiment 2, the UE may release one or more current and/or existing TAG cells that are not in the first set of cells.

In some examples, in response to (and/or when) (i) initiating or completing a mobility procedure associated with adding/activating the first set of cells (of the one or more first sets) associated with a TAG id (indicated in the first information, for example) and/or (ii) receiving the second information, the UE may release/remove/deactivate one or more cells (e.g. SCells) that (i) are not indicated in the first set of cells (and/or are not indicated in the first information or the second information), and (ii) are associated with the same TAG id (e.g., the same TAG id indicated, by the first information, as being associated with the first set of cells). In the present disclosure, the term "release/remove/deactivate" may refer to release, remove and/or deactivate (e.g., releasing, removing and/or deactivating a cell). Alternatively and/or additionally, in response to (and/or when) (i) initiating or completing the mobility procedure associated with adding/activating the first set of cells associated with a TAG id (indicated in the first information, for example) and/or (ii) receiving the second information, the UE may release/remove/deactivate cells (e.g., SCells) that are not indicated in the first set of cells (and/or that are not indicated in the first information).

Embodiment 3

In Embodiment 3, the first information may indicate Timing Advance of a set of cells (per TAG, for example). For example, the first information may indicate a new TAG (and/or TAG id associated with the new TAG) associated with a set of cells.

In some examples, a set of cells may be associated with a first TAG id different from a current and/or existing TAG id of one or more Cell Groups of the UE (e.g., when the set of cells does not share a same timing advance value with any of the one or more existing cell groups). The first information and/or the second information may be indicative of the first TAG id. The first TAG id may be used to indicate that one or more cells associated with the first TAG id share the same timing advance value. Different sets of the one or more first sets (e.g., the one or more first sets of cells indicated by the first information) may share and/or be associated with a same TAG id. Alternatively and/or additionally, different sets of the one or more first sets may be associated with different TAG ids.

In response to (and/or when) (i) initiating or completing a mobility procedure associated with adding/activating one or more cells in a second set of cells of the one or more first sets of cells and/or (ii) receiving the second information, the UE may apply, configure, and/or set a TAG id (e.g., tag-Id) of the second set of cells based on the first TAG id (in the first information, for example). For example, the TAG id applied, configured and/or set of the second set of cells may be the same as the first TAG id. Alternatively, the UE may apply, configure, and/or set the second set of cells with a TAG that is associated with a TAG id that is different than the first TAG id indicated in the first information. In some examples, the UE may apply, configure, and/or set Cells in the same set with a same TAG. The UE may perform a random access procedure (to obtain a timing advance value for the second set of cells, for example) in response to (and/or after) receiving the second information if (and/or when) the second set of cells is associated with (e.g., configured with and/or indicated as being associated with) a TAG id different from one or more TAG ids of one, some and/or all current and/or existing TAGs (e.g., TAGs that the UE uses and/or is configured with before and/or after receiving the second information).

Embodiment 4

In Embodiment 4, one or more current and/or existing cells associated with a TAG may be replaced with one or more cells associated with a new TAG.

In some examples, the UE may replace one or more current and/or existing cells associated with a first TAG id with one or more new cells associated with a second TAG id indicated in the first and/or second information. The UE may replace the one or more current and/or existing cells with the one or more new cells in response to (and/or when) (i) receiving the second information and/or (ii) initiating or completing a mobility procedure. The second information may indicate to the UE (e.g., instruct the UE) to add/activate the one or more new cells. The one or more new cells may be associated with a same TAG (e.g., a same TAG that is indicated by the first information and/or the second information). The one or more new cells may be associated with a type of TAG (e.g., pTAG or sTAG of MCG or SCG) that is the same as a type of TAG of the one or more current and/or existing cells. The type of TAG may be indicated by the first information and/or the second information. In response to adding/activating the one or more new cells, the UE may assign and/or apply the one or more new cells with the first TAG id (as the new TAG id as Serving Cells). The UE may apply a timing advance value, associated with the one or more current and/or existing cells, to the one or more new cells. Alternatively or additionally, the UE may apply a different timing advance value (different from the timing advance value of the one or more current and/or existing cells) to the one or more new cells. The UE may determine whether to apply a timing advance value, associated with the one or more current and/or existing cells, to the one or more new cells based on whether current and/or existing cells in the TAG are released/removed/deactivated (e.g., based on whether all current and/or existing cells in the TAG are released/removed/deactivated). The UE may determine whether to apply a timing advance value, associated with the one or more current and/or existing cells, to the one or more new cells based on an indication in the second information. The UE may apply a timing advance value, associated with the one or more current and/or existing cells, to the one or more new cells if (and/or when) at least one cell of the one or more current and/or existing cells is not released/removed/deactivated. The UE may not apply a timing advance value, associated with the one or more current and/or existing cells, to the one or more new cells if (and/or when) the one or more current and/or existing cells (e.g., all of the one or more current and/or existing cells) are released/removed/deactivated. The one or more current and/or existing cells in the TAG (e.g., all current and/or existing cells in the TAG) may be released/removed/deactivated in response to the second information. The UE may stop a timeAlignmentTimer associated with the TAG if (and/or when) the timing advance value associated with the one or more current and/or existing cells is not applied to the one or more new cells. The UE may initiate a random access procedure (on a cell, such as a single cell, of the one or more new cells) if (and/or when) the timing advance value associated with the one or more current and/or existing cells is not applied to the one or more new cells.

Embodiment 5

In Embodiment 5, whether to initiate a random access procedure (e.g., a Random Access Channel (RACH) procedure) may be determined based on whether there is a cell that does not belong to a current and/or existing TAG (e.g., whether to perform the random access procedure may be implicitly indicated).

In some examples, the UE may determine whether to initiate (and/or perform) a random access procedure (e.g., a random access procedure performed to obtain a timing advance value for a set of cells) during and/or after a mobility procedure adding/activating the set of cells based on whether the set of cells (that are added/activated in the mobility procedure) are associated with (e.g., whether the set of cells belong to) one or more current and/or existing TAGs in MCG or SCG. The UE may initiate a random access procedure on a first cell in the set of cells if (and/or when) the first cell is not associated with (e.g., the first cell does not belong to) a current and/or existing TAG (e.g., if the first cell is not associated with any current and/or existing TAG, the UE may initiate the random access procedure on the first cell). In some examples, the UE may not initiate a random access procedure on a second cell in the set of cells if (and/or when) the second cell is associated with (e.g., the second cell belongs to) a current and/or existing TAG (e.g., if the second cell is associated with any current and/or existing TAG, the UE may not initiate the random access procedure on the second cell). Alternatively and/or additionally, the UE may determine whether to initiate (and/or perform) the random access procedure during and/or after a mobility procedure adding/activating the set of cells based on whether the set of cells (that are added/activated in the mobility procedure) are associated with (e.g., whether the set of cells belong to) a valid timing advance value. The UE may initiate a random access procedure on a first cell in the set of cells if (and/or when) the first cell is not associated with (e.g., the first cell does not belong to) a valid timing advance value (e.g., if the first cell is not associated with any valid timing advance value, the UE may initiate the random access procedure on the first cell). In some examples, the UE may not initiate a random access procedure on a second cell in the set of cells if (and/or when) the second cell is associated with (e.g., the second cell belongs to) a valid timing advance value (e.g., if the second cell is associated with any valid timing advance value, the UE may not initiate the random access procedure on the second cell).

Embodiment 6

In Embodiment 6, whether to initiate a random access procedure (e.g., a RACH procedure) may be explicitly indicated.

In some examples, the UE may be indicated (e.g., instructed) by a network (e.g., via an indication in the first information and/or the second information) whether to initiate a random access procedure (e.g., a random access procedure to obtain timing advance value) on a cell in response to (i) receiving the second information and/or (ii)

initiating or completing a mobility procedure (e.g., a mobility procedure performed in response to the second information) associated with adding the cell. For example, for each set of the one or more first sets of cells (e.g., the one or more first sets of cells indicated by the first information), there may be an indication (e.g., at least one of a flag, a parameter value, a timing advance information, etc.) of whether to initiate a random access procedure on a cell of the set when adding/activating the cell in response to (i) receiving the second information and/or a mobility procedure (e.g., a mobility procedure performed in response to the second information), wherein the indication may be included in the first information and/or the second information. In an example, the first information and/or the second information may comprise an indication (e.g., at least one of a flag, a parameter value, a timing advance information, etc.) to initiate a random access procedure on a cell of a set of the one or more first sets, wherein, based on the indication, the UE may initiate the random access procedure on the cell in response to (i) receiving the second information and/or (ii) initiating or completing a mobility procedure (e.g., a mobility procedure in which the cell is added/activated in response to the second information). Alternatively and/or additionally, the first information and/or the second information may comprise an indication (e.g., at least one of a flag, a parameter value, a timing advance information, etc.) not to initiate a random access procedure on a cell of a set of the one or more first sets, wherein, based on the indication, the UE may not initiate a random access procedure on the cell in response to (i) receiving the second information and/or (ii) initiating or completing a mobility procedure (e.g., a mobility procedure in which the cell is added/activated in response to the second information).

In some examples, the one or more first sets may comprise (i) a first set of cells that is indicated (and/or configured) not having a random access procedure requirement (e.g., the first information and/or the second information may indicate that no random access procedure is needed for the first set of cells), and (ii) a second set of cells that is indicated (and/or configured) as being associated with a random access procedure requirement (e.g., the first information and/or the second information may indicate that a random access procedure is needed for the second set of cells). In response to receiving the second information, the UE initiates a mobility procedure and/or adds/activates one or more Cells (e.g., the one or more cells may be added/activated in the mobility procedure). In some examples, if (and/or when) the second information indicates adding/activating one or more cells in the first set of cells (and does not indicate adding/activating one or more cells in the second set of cells), the UE does not initiate a random access procedure (on the one or more cells in the first set of cells, for example) in response to (i) the second information and/or (ii) initiating or completing the mobility procedure (e.g., the UE does not initiate a random access procedure on the one or more cells based on the one or more cells not being associated with a random access procedure requirement). In some examples, if (and/or when) the second information indicates adding/activating one or more cells in the second set of cells (and does not indicate adding/activating one or more cells in the first set of cells, for example), the UE initiates a random access procedure (on the one or more cells in the second set of cells, for example) in response to (i) the second information and/or (ii) initiating or completing the mobility procedure (e.g., the UE initiates the random access procedure on the one or more cells based on the one or more cells being associated with the random access procedure requirement).

Alternatively and/or additionally, the UE may be provided with (e.g., configured with) one or more random access resources/configurations (e.g., one or more RACH resources/configurations) associated with one or more sets of the one or more first sets of cells (e.g., the UE may be provided with the one or more random access resources/configurations via the first information). The UE may determine whether to initiate a random access procedure on one or more cells of a set of the one or more first sets of cells (e.g., whether to initiate the random access procedure in response to (i) receiving the second information and/or (ii) initiating or completing a mobility procedure adding/activating the one or more cells) based on whether the UE is provided with (e.g., configured with) one or more random access resources/configurations for the set comprising the one or more cells. In some examples, if (and/or when) the UE is provided with (e.g., configured with) one or more random access resources/configurations for the set, the UE may initiate a random access procedure on the one or more cells of the set (e.g., the UE may initiate the random access procedure in response to (i) receiving the second information and/or (ii) initiating or completing a mobility procedure adding/activating the one or more cells, for example). In some examples, if (and/or when) the UE is not provided with (e.g., configured with) one or more random access resources/configurations for the set, the UE may not initiate a random access procedure on the one or more cells of the set (e.g., the UE may not initiate a random access procedure in response to (i) receiving the second information and/or (ii) initiating or completing a mobility procedure adding/activating the one or more cells, for example). The first information may not provide timing advance information for the set if (and/or when) one or more random access resources/configurations are provided/configured for the set. In the present disclosure, the term "resources/configurations" may refer to resources and/or configurations.

Embodiment 7

In Embodiment 7, a timing advance (e.g., a new $N_{TA}$) of a set of cells may be indicated (per TAG, for example). For example, the timing advance may be indicated by the first information.

In some examples, one or more sets of the one or more first sets of cells may be associated with a timing advance information (included in the first information, for example). For example, the timing advance information may be provided (e.g., indicated in the first information) for the one or more sets. The timing advance information may comprise a timing advance (e.g., $N_{TA}$) between uplink (UL) and downlink (DL). The timing advance information may comprise timeAlignmentTimer. The timing advance information may comprise a TAG id. The timing advance information may comprise one or more parameters in TAG-config. Each set (of the one or more sets) may be associated with a timing advance between uplink and downlink. For example, each set of the one or more sets may be associated with a $N_T A$ (e.g., each set of the one or more sets may be associated with a different $N_T A$). Alternatively and/or additionally, for each set of the one or more sets, the timing advance information may comprise a timing advance (e.g., $N_{TA}$) between uplink and downlink. The UE may maintain (e.g., stored and/or updated) timing advance information (e.g., $N_{TA}$) for each set of the one or more first sets of cells. In response to (i) the second information and/or (ii) initiation or completion of a mobility procedure adding/activating a cell of a first set of the one or more first sets of cells, the UE may apply timing advance information (e.g., $N_{TA}$) associated with the first set on the cell (e.g., the timing advance information may be maintained by the UE for the first set).

In some examples, if (and/or when) a set (of the one or more first sets) is associated with a timing advance information (e.g., a timing advance information that is maintained and/or indicated for the set and/or that is included in the first information), the UE may not initiate a random access procedure on a cell in the set when adding/activating the cell. Alternatively and/or additionally, if (and/or when) a second set (of the one or more first sets) is not associated with a timing advance information (e.g., a timing advance information is not maintained and/or indicated for the second set and/or the first information does not comprise a timing advance information for the second set), the UE may initiate a random access procedure on a second cell (e.g., a PCell of a candidate set of cells) in the second set of the one or more first sets when adding/activating the second cell. In some examples, the first information may not indicate timing advance information for a set of the one or more first sets (and/or may not indicate timing advance information for at least a part of the set). In some examples, the UE may not determine to (and/or may determine not to) initiate a random access procedure on a SCell in the set of the one or more first sets.

FIG. 7 illustrates a scenario 700 associated with a UE and a network "NW". The UE may perform communication with the NW via Serving Cells comprising Cell 1, Cell 2 and Cell 3, wherein each of the Serving Cells is in one of three TAGs (e.g., three original TAGs) associated with TAG id 1, TAG id 2, and TAG id 3, respectively (e.g., Cell 1 is associated with TAG id 1, Cell 2 is associated with TAG id 2 and Cell 3 is associated with TAG id 3). TAG with TAG id 1 is associated with a timing advance value $N_{TA,1}$. TAG with TAG id 2 is associated with a timing advance value $N_{TA,2}$. TAG with TAG id 3 is associated with a timing advance value $N_{TA,3}$. The NW transmits a first information 704 to the UE (e.g., via a RRC message). The first information 704 indicates (i) a Cell Group A (e.g., a candidate cell group) comprising Cell 4 and Cell 5, and (ii) a Cell Group B (e.g., a candidate cell group) comprising Cell 6. Cell 4 is configured with TAG id 1 (e.g., ServingCellConfig of Cell 4 indicates that Cell 4 belongs to TAG id 1). Cell 5 is configured with TAG id 2 (e.g., ServingCellConfig of Cell 5 indicates that Cell 5 belongs to TAG id 2). Cell 6 is configured with TAG id 1 (e.g., ServingCellConfig of Cell 6 indicates that Cell 6 belongs to TAG id 1). The NW transmits a second information 710 to the UE for adding and/or activating Cell Group A (e.g., the NW may transmit the second information 710 to initiate a mobility procedure to switch Serving Cells of the UE to Cell Group A). The second information 710 indicates TAG id 2 and TAG id 3 (for Cell 4 and Cell 5 and/or for Cell Group A, for example). In response to receiving the second information 710, the UE adds Cell 4 in a TAG with TAG id 1 (as indicated in the first information 704, for example) and adds Cell 5 in a TAG with TAG id 2. In response to the second information 710 (and/or in response to adding Cell 4 and Cell 5), the UE applies the timing advance values associated with TAG id 2 (e.g., original TAG id 2) and TAG id 3 to Cell 4 and Cell 5, respectively. For example, the UE may (i) apply the timing advance value $N_{TA,2}$ to Cell 4 (based on the second information 710 indicating TAG id 2 and/or TAG id 2 being associated with the timing advance value $N_{TA,2}$, for example) and/or (ii) apply the timing advance value $N_{TA,3}$ to Cell 5 (based on the second information 710 indicating TAG id 3 and/or TAG id 3 being associated with the timing advance value $N_{TA,3}$, for example).

FIG. 8 illustrates a scenario 800 associated with the UE and the NW. In the scenario 800, after receiving the first information 704 (shown in and/or described with respect to FIG. 7), the UE may receive a second information 810 indicative of a timing advance value $N_{TA,4}$ and a timing advance value $N_{TA,5}$ (for Cell 4 and Cell 5 and/or for Cell Group A). In response to receiving the second information 810, the UE adds Cell 4 in a TAG with TAG id 1 (as indicated in first information 704, for example) and adds Cell 5 in a TAG with TAG id 2. In response to the second information 810 (and/or in response to adding Cell 4 and Cell 5), the UE applies the timing advance values indicated in the second information to Cell 4 (e.g., timing advance value $N_{TA,4}$ is applied to Cell 4) and Cell 5 (e.g., timing advance value $N_{TA,5}$ is applied to Cell 5), respectively.

FIG. 9 illustrates a scenario 900 associated with the UE and the NW. In the scenario 900, after receiving the first information 704 (shown in and/or described with respect to FIG. 7), the UE may receive a second information 910. The second information 910 (and/or the first information 704) is not indicative of timing advance information associated with Cells (e.g., Cell 4 and Cell 5) in Cell group A. The first information 704 or the second information 910 may indicate (e.g., via a SpCellConfig) Cell 4 to be a PCell of the Cell group A. In response to the second information 910, the UE adds/activates Cell 4 and Cell 5 in Cell group A. In response to the second information 910 (and/or in response to adding Cell 4 and Cell 5), the UE determines to initiate a random access procedure 914 on Cell 4 (e.g., the UE may initiate the random access procedure 914 on Cell 4 based on Cell 4 being a PCell of Cell group A and/or based on Cell 4 not being associated with a valid timing advance value). Alternatively and/or additionally, the UE may initiate a random access procedure on Cell 5 (e.g., the UE may initiate the random access procedure on Cell 5 based on Cell 5 not being associated with a valid timing advance value). Alternatively, the UE may not determine to (and/or may determine not to) initiate a random access procedure on Cell 5 (based on Cell 5 being a SCell, for example). The NW may indicate to the UE (e.g., instruct the UE) to initiate a random access procedure on Cell 5 (e.g., the NW may instruct the UE to initiate the random access procedure via a PDCCH order).

Each set of the one or more first sets may be associated with (e.g., may be assigned with) an index/identity. The index/identity may be provided (e.g., indicated) in the first information.

The second information (received by the UE) may indicate an index/identity associated with a first set among the one or more first sets. The UE may add and/or activate one or more cells, comprising one, some and/or all cells associated with (e.g., indicated in) the first set, in response to a mobility procedure corresponding to the second information (e.g., in response to initiation or completion of the mobility procedure) and/or in response to reception of the second information. The UE may consider the one or more cells associated with (e.g., indicated in) the first set to be one or more Serving Cells in response to the mobility procedure (e.g., in response to initiation or completion of the mobility procedure) and/or in response to reception of the second information. The second information may indicate whether the first set is for MCG or for SCG. The first set may correspond to a set of one or more cells and/or a set of one or more CGs.

Embodiment 8

In Embodiment 8, TAG information and/or $N_{TA}$ information may be indicated (per cell, for example) in the first information.

In some examples, the first information may indicate one or more first cells. Each of the one or more first cells may be a Serving Cell, a neighboring cell, a non-serving cell, an ACell (e.g., an Assisting and/or Additional Cell) and/or a cell associated with a PCI that is different from Serving Cells of the UE. Each of the one or more first cells may be associated with (e.g., configured with) a TAG. For example, the one or more first cells may be associated with (e.g., configured with) different and/or separate TAGs. In an example, each of the one or more first cells may be associated with (e.g., configured with) TAG id, wherein the TAG id may be associated with a TAG id of a current and/or existing pTAG or sTAG of a MCG or a SCG.

For example, the first information may comprise a first cell configuration (e.g., one or more parameters in ServingCellConfig) for a first cell. The first cell configuration may be indicative of (e.g., may comprise) a first TAG id associated with the first cell. The first information may comprise a second cell configuration for a second cell. The second cell configuration may be indicative of (e.g., may comprise) a second TAG id associated with the second cell. In response to (i) receiving the second information and/or (ii) initiating or completing a mobility procedure adding/activating the first cell and the second cell, the UE may (A) apply timing advance information (e.g., a first $N_{TA}$) of a first TAG to the first cell, wherein the first TAG is associated with the first TAG id, and (B) apply timing advance information (e.g., a second $N_{TA}$) of a second TAG to the second cell, wherein the second TAG is associated with the second TAG id. The UE may consider the first cell to be a cell in the first TAG (e.g., the UE may assign the first cell to the first TAG) when the first cell is added/activated as a Serving Cell. The UE may consider the second cell to a cell in the second TAG (e.g., the UE may assign the second cell to the second TAG) when the second cell is added/activated as a Serving Cell.

Alternatively and/or additionally, the UE may determine whether to initiate a random access procedure on a cell (to obtain timing advance for the cell, for example) when adding/activating the cell associated with a TAG based on whether timing advance information (e.g., $N_{TA}$) of the TAG is valid. The timing advance information may be valid when a time alignment timer (e.g., timeAlignmentTimer) of the TAG is running. The UE may determine whether to initiate a random access procedure on a cell (to obtain TA for the cell, for example) when (and/or after) adding the cell in a TAG based on whether a time alignment timer (e.g., timeAlignmentTimer) associated with the TAG is running. The UE may initiate a random access procedure on the cell when (and/or after) adding the cell in the TAG if (and/or when) the time alignment timer associated with the TAG is not running. The UE may not apply a $N_{TA}$ of the TAG on the cell when the time alignment timer is not running and/or the $N_{TA}$ is invalid.

Alternatively and/or additionally, the first information may indicate a timing advance information for each of the one or more first cells. The timing advance information may comprise a timing advance (e.g., a timing advance value, such as $N_{TA}$) between uplink and downlink. The timing advance information may comprise timeAlignmentTimer. The timing advance information may comprise TAG id. The timing advance information may comprise one or more parameters in TAG-config. The first information may indicate a first $N_{TA}$ for the first cell. In response to (i) receiving the second information and/or (ii) initiating or completing the mobility procedure adding/activating the first cell, the UE may apply the first $N_{TA}$ on the first cell. The first information may indicate a second $N_{TA}$ for the second cell. In response to (i) receiving the second information and/or (ii) initiating or completing the mobility procedure adding/activating the second cell, the UE may apply the second $N_{TA}$ on the second cell.

Embodiment 9

In Embodiment 9, whether to initiate a random access procedure (e.g., a RACH procedure) for a cell may be indicated.

In some examples, the first information may not indicate (and/or may not configure) a timing advance information for a Cell (and/or a subset of cells) of the one or more first cells. The second information may not indicate a timing advance information for the Cell (and/or the subset of cells) of the one or more first cells. Alternatively and/or additionally, the first information may (i) indicate a TAG for a cell (and/or a subset of cells) of the one or more first cells and (ii) not indicate timing advance information (e.g., $N_{TA}$) of the cell (and/or the subset of cells). The UE may determine whether to initiate a random access procedure on a first cell (e.g., a random access procedure that is performed to obtain a timing advance value, and/or that is performed in response to (i) receiving the second information and/or (ii) initiating or completing a mobility procedure adding/activating the first cell) based on whether the first cell has a valid timing advance value ($N_{TA}$) and/or a TAG (with a valid $N_{TA}$, for example) (in the first information, for example). The valid timing advance value may be indicated and/or configured via the first information and/or the second information. The timing advance value may be valid if (and/or when) a timeAlignmentTimer of a TAG associated with the timing advance value is running. The timing advance value may not be valid if (and/or when) a timeAlignmentTimer of a TAG associated with the timing advance value is not running. The UE may not apply a $N_{TA}$ when adding the cell in the TAG if (and/or when) the $N_{TA}$ is not valid. The UE may stop the time alignment timer of the TAG if $N_{TA}$ (e.g., $N_{TA}$ of the TAG) is not applied. Alternatively and/or additionally, the UE may stop the time alignment timer of a TAG if the UE initiates (and/or is indicated and/or instructed to initiate) a random access procedure on a cell associated with the TAG, wherein the UE adds/activates the cell in response to (i) the second information and/or (ii) initiating or completing the mobility procedure adding/activating the cell.

Alternatively and/or additionally, the first information may indicate a random access resource/configuration for a cell of the one or more first cells. The first information may not provide timing advance information for the cell if (and/or when) the random access resource/configuration is provided/configured for the cell. The UE may determine whether to initiate a random access procedure on a second cell (e.g., a random access procedure that is performed to obtain a timing advance value, and/or that is performed in response to (i) receiving the second information and/or (ii) initiating or completing a mobility procedure adding/activating the second cell) based on whether the second cell is configured with random access resource/configuration. For example, the UE may initiate the random access procedure on the second cell if (and/or when) the first information indicates a random access resource/configuration for the second cell (and does not indicate timing advance information for the second cell, for example). Alternatively and/or additionally, the UE may not initiate the random access procedure on the second cell if (and/or when) the first information does not indicate a random access resource/configuration for the second cell (and indicates timing advance information for the second cell, for example).

Embodiment 10

In Embodiment 10, the second information may be indicative of one or more second cells, which may be a subset of the one or more first cells indicated in the first information.

In some examples, the second information may indicate one or more second cells.

The second information may indicate timing advance information (e.g., $N_{TA}$) and/or a TAG (e.g., via a TAG id) associated with the one or more second cells. The first information may not indicate the timing advance information associated with the one or more first cells (and/or may not indicate the TAG associated with the one or more second cells). Alternatively and/or additionally, the first information may not indicate timing advance information and/or TAG associated with the one or more first sets of cells. The one or more second cells may be a subset of the one or more first cells indicated in the first information. The UE may add/activate the one or more second cells in response to (i) the second information and/or (ii) initiating or completing a mobility procedure. The UE may initiate a mobility procedure adding/activating the one or more second cells in response to receiving the second information. The UE may consider the one or more second cells to be one or more Serving Cells in response to (i) receiving the second information and/or (ii) initiation or completion of the mobility procedure. The timing advance information may comprise timing advance (e.g., a timing advance value, such as $N_{TA}$) between uplink and downlink. The timing advance information may comprise timeAlignmentTimer. The timing advance information may comprise TAG id. The timing advance information may comprise one or more parameters in TAG-config. Alternatively and/or additionally, the second information may indicate a type of the one or more second cells (e.g., a pTAG or a sTAG of a MCG/SCG). The UE may apply timing advance information (indicated in the second information, for example) associated with a cell in response to (i) the second information and/or (ii) initiating or completing a mobility procedure adding/activating the cell. The cell may be associated with a TAG (e.g., a TAG indicated by the second information). The timing advance information may be associated with a TAG (e.g., a TAG indicated by the second information and/or first information). The UE may determine whether to apply the timing advance information (e.g., $N_{TA}$) on the cell based on whether the timing advance information is valid. The UE may not apply the timing advance information if the timing advance information is invalid (e.g., the timing advance information is invalid when a time alignment timer of the TAG associated with the timing advance information is not running and/or is expired). Alternatively and/or additionally, the UE may initiate a random access procedure on the cell if the time alignment timer of the TAG associated with the timing advance information is not running. Alternatively and/or additionally, the UE may apply the $N_{TA}$ of the TAG on the cell when the time alignment timer of the TAG is not running.

Alternatively and/or additionally, the second information may indicate a TAG (e.g., a single TAG) (and/or the second information may indicate one or more cells associated with the TAG). The second information may not indicate (and/or may not be allowed and/or configured to indicate) more than one TAG. Alternatively and/or additionally, the second information may not indicate (and/or may not be allowed and/or configured to indicate) cells that are associated with multiple (different) TAGs. Accordingly, the one or more second cells (indicated by the second information) may be associated with the same TAG. In some examples, the second information may indicate a TAG id (e.g., a single TAG id). In response to (i) receiving the second information and/or (ii) initiation or completion of a mobility procedure, the UE may add/activate one or more cells (e.g., one or more cells of the one or more first cells and/or the one or more second cells that are indicated/configured in the first information and/or the second information) that are associated with the TAG id. Alternatively and/or additionally, the second information may indicate a type of a TAG. In response to (i) receiving the second information and/or (ii) initiation or completion of a mobility procedure, the UE may add/activate one or more cells (e.g., one or more cells of the one or more first cells and/or the one or more second cells that are indicated/configured in the first information and/or the second information) that are associated with the type of the TAG. In response to (i) receiving the second information and/or (ii) initiation or completion of a mobility procedure, the UE may release/remove/deactivate one or more current and/or existing cells that (A) are associated with the type of the TAG and (B) are not indicated in the second information.

For example, the first information may indicate a first cell associated with a pTAG of MCG. The second information may indicate to the UE (e.g., instruct the UE) to add/activate cells (e.g., add/activate the cells as SCells) that are associated with pTAG of MCG indicated in the first information. In some examples, in response to receiving the second information, the UE adds/activates the first cell and applies timing advance value ($N_{TA}$) associated with the pTAG of MCG of the UE to the first cell.

Alternatively and/or additionally, the first information may indicate a TAG (e.g., via TAG id) associated with the one or more first cells (and/or the one or more first sets of cells), and the second information may indicate timing advance information associated with the one or more second cells.

Alternatively and/or additionally, the second information may indicate multiple TAGs. The UE may add/activate one or more cells indicated in the first information and/or the second information in response to (i) receiving the second information and/or (ii) initiating or completing the mobility procedure, wherein the one or more cells may be associated with (e.g., configured with) one of the multiple TAGs. For example, the UE may receive the second information indicating a first TAG and a second TAG.

Embodiment 11

In Embodiment 11, one or more cells that are (i) not indicated in the second information and/or (ii) not associated with a TAG (e.g., an original TAG) may be released/removed/deactivated.

In some examples, in response to (and/or when) (i) initiating or completing a mobility procedure associated with adding/activating one or more cells associated with a TAG (e.g., a TAG indicated in the second information) and/or (ii) receiving the second information, the UE may release/remove/deactivate one or more third cells (e.g., SCells) that (A) are not the one or more cells associated with the TAG and/or (B) are not indicated in the second information. Alternatively and/or additionally, the UE may release/remove/deactivate one or more fourth cells that (i) are activated before initiating the mobility procedure and/or before receiving the second information, and/or (ii) are not indicated in the second information.

Embodiment 12

In Embodiment 12, a TA of a Serving Cell may be applied (e.g., implicitly implied) to a non-serving cell if the non-serving cell is a non-serving multi-Transmission and Reception Point (mTRP) ACell.

In some examples, the UE may apply a timing advance value of a Serving Cell to a non-serving cell in response to (i) the second information and/or (ii) initiating or completing a mobility procedure adding/activating the non-serving cell (e.g., adding/activating the non-serving cell as a Serving Cell or as an ACell for inter-cell mTRP operation). The non-serving cell may be an assisting cell or an ACell associated with the Serving Cell. The non-serving cell may be associated with a PCI different from any Serving Cell of the UE. The UE may perform inter-cell mTRP operation on the non-serving cell and the Serving Cell.

Alternatively and/or additionally, the UE may initiate a random access procedure on the non-serving cell (e.g., the random access procedure may be initiated to obtain TA for the non-serving cell) in response to (i) the second information and/or (ii) initiating or completing a mobility procedure adding/activating the non-serving cell for performing inter-cell mTRP operation with the Serving Cell.

FIG. 10 illustrates a scenario 1000 associated with a UE and a network "NW". The UE may be configured with and/or may activate Cell 1 (e.g., a SCell) and Cell 2 (e.g., a SCell). In some examples, the UE performs communication with the NW via Cell 1 and Cell 2. Cell 1 is associated with a TAG with TAG id 1. Cell 2 is associated with a TAG with TAG id 2. The NW transmits a first information 1004 indicating Cell 3 with TAG id 1 (e.g., the first information 1004 may indicate that Cell 3 is associated with TAG id 1), Cell 4 with TAG id 2 (e.g., the first information 1004 may indicate that Cell 4 is associated with TAG id 2), and Cell 5 with TAG id 2 (e.g., the first information 1004 may indicate that Cell 5 is associated with TAG id 2). In some examples, the UE does not add/activate the Cells indicated in the first information 1004 in response to receiving the first information 1004. The NW transmits a second information 1010 indicating addition/activation of Cell 3 and Cell 4. In response to the second information 1010, the UE adds/activates Cell 3 and Cell 4 (as SCells, for example). Cell 3 and/or Cell 4 may be added (as SCells, for example) in response to receiving the second information 1010. The UE may applies one or more TAG ids indicated in the first information and set Cell 3 in TAG associated with TAG id 1 and configure Cell 4 in TAG associated with TAG id 2. For example, the UE may add Cell 3 in the TAG associated with TAG id 1 based on the first information 1004 indicating that Cell 3 is associated with TAG id 1. The UE may add Cell 4 in the TAG associated with TAG id 2 based on the first information 1004 indicating that Cell 4 is associated with TAG id 2. The UE may (i) apply timing advance value (e.g., $N_{TA}$) associated with TAG id 1 to Cell 3 and (ii) apply timing advance value (e.g., $N_{TA}$) associated with TAG id 2 to Cell 4.

Figure 11:
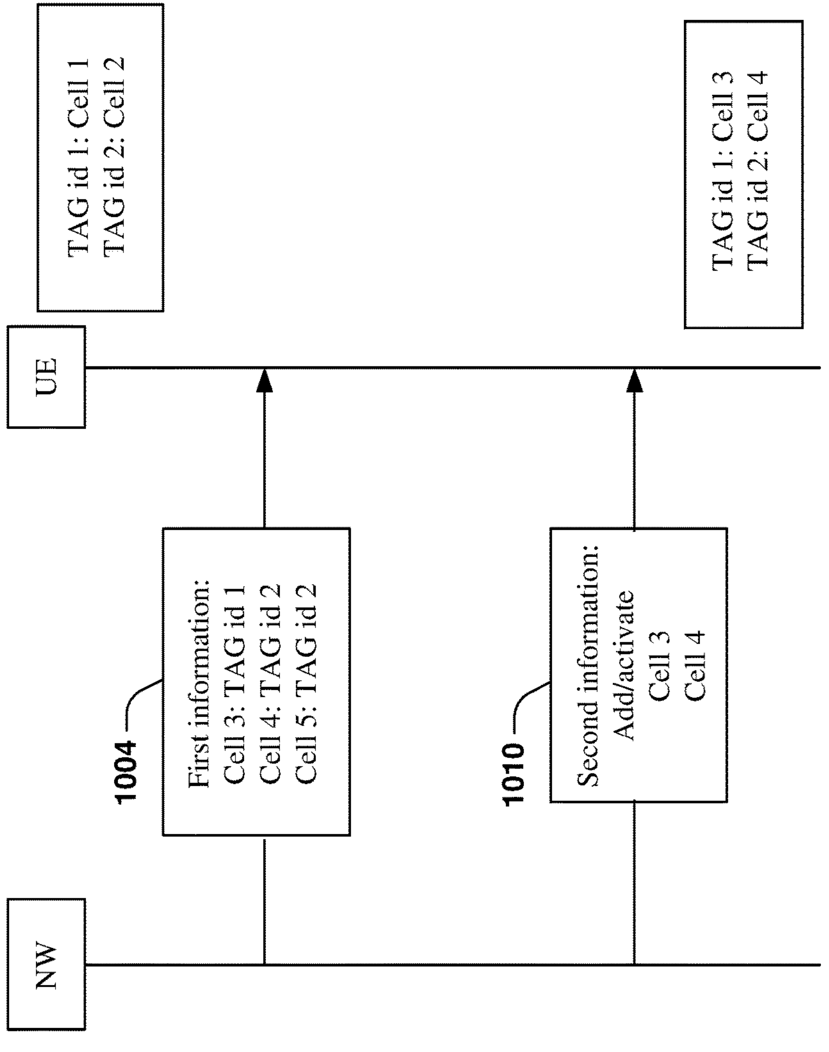
FIG. 11 is a diagram illustrating an exemplary scenario associated with a UE and a network according to one exemplary embodiment.

In the scenario 1000 shown in FIG. 10, the UE may not release/remove/deactivate Cell 1 and Cell 2 in response to receiving the second information 1010. In some examples, the UE may release/remove/deactivate Cell 1 and Cell 2 in response to receiving the second information 1010. FIG. 11 illustrates a scenario 1100 in which the UE releases/removes/deactivates Cell 1 and Cell 2 in response to receiving the second information 1010. After receiving the second information 1010, the UE may be configured with (and/or may maintain) Cell 3 in the TAG with TAG id 1 and Cell 4 in the TAG with TAG id 2.

Figure 12:
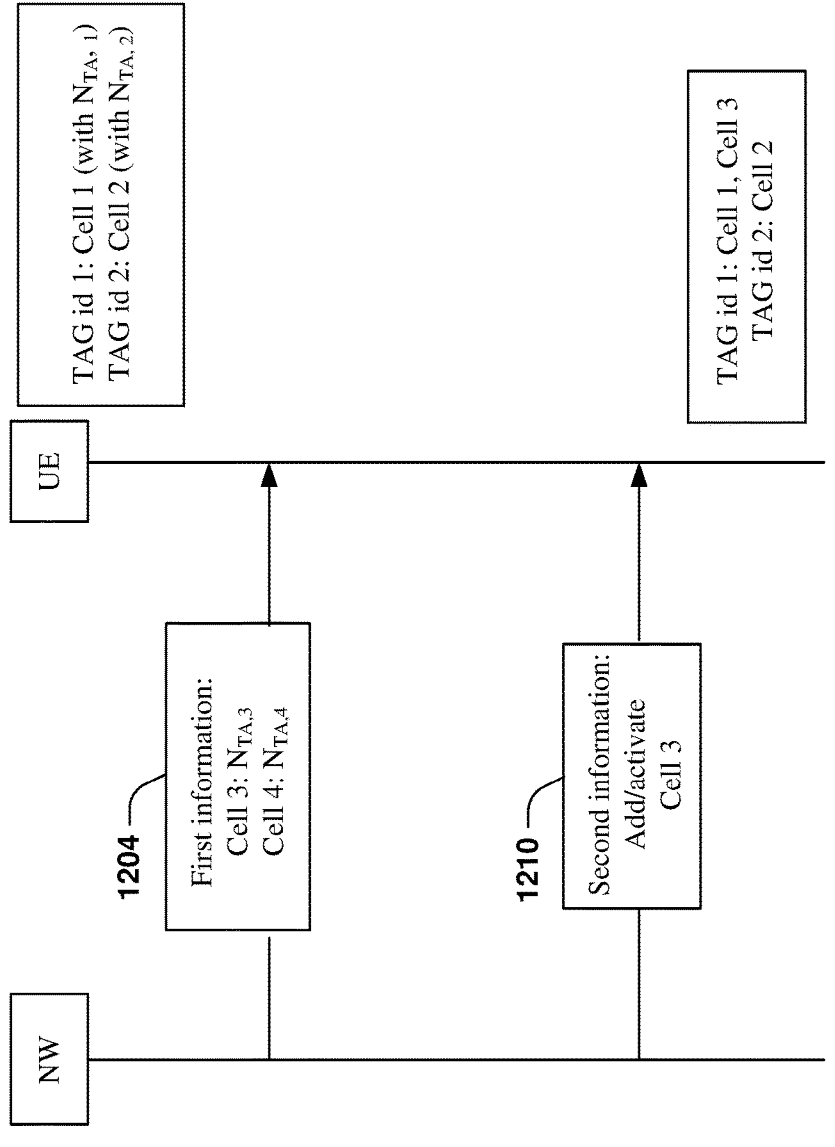
FIG. 12 is a diagram illustrating an exemplary scenario associated with a UE and a network according to one exemplary embodiment.

FIG. 12 illustrates a scenario 1200 associated with a UE and a network "NW". The UE may be configured with and/or may activate Cell 1 and Cell 2. In some examples, the UE performs communication with the NW via Cell 1 and Cell 2. The UE may be configured with a first TAG with TAG id 1 and a first timing advance value $N_{TA,1}$. The UE may be configured with a second TAG with TAG id 2 and a second timing advance value $N_{TA,2}$. Cell 1 is associated with the first TAG and/or the first timing advance value $N_{TA,1}$. Cell 2 is associated with the second TAG and/or the second timing advance value $N_{TA,2}$. The NW transmits a first information 1204 indicating Cell 3 with timing advance value $N_{TA,3}$ (e.g., the first information 1204 may indicate that Cell 3 is associated with timing advance value $N_{TA,3}$) and Cell 4 with timing advance value $N_{TA,4}$ (e.g., the first information 1204 may indicate that Cell 4 is associated with timing advance value $N_{TA,4}$). The NW transmits a second information 1210 indicating to the UE (e.g., instructing the UE) to add/activate Cell 3. In some examples, in response to the second information 1210, the UE may configure and/or add/activate Cell 3 with applying its timing advance to $N_{TA,3}$ provided in the first information 1204. In an example, in response to the second information 1210, the UE may (i) add and/or activate Cell 3 and/or (ii) apply the timing advance value $N_{TA,3}$ to Cell 3. In the scenario 1200 of FIG. 12, the timing advance value $N_{TA,3}$ may be the same value as (e.g., may be equal to) timing advance value $N_{TA,1}$ associated with TAG id 1. The UE may add Cell 3 in the first TAG with TAG id 1 (based on $N_{TA,3}$ being equal to $N_{TA,1}$ associated with TAG id 1, for example).

Figure 13:
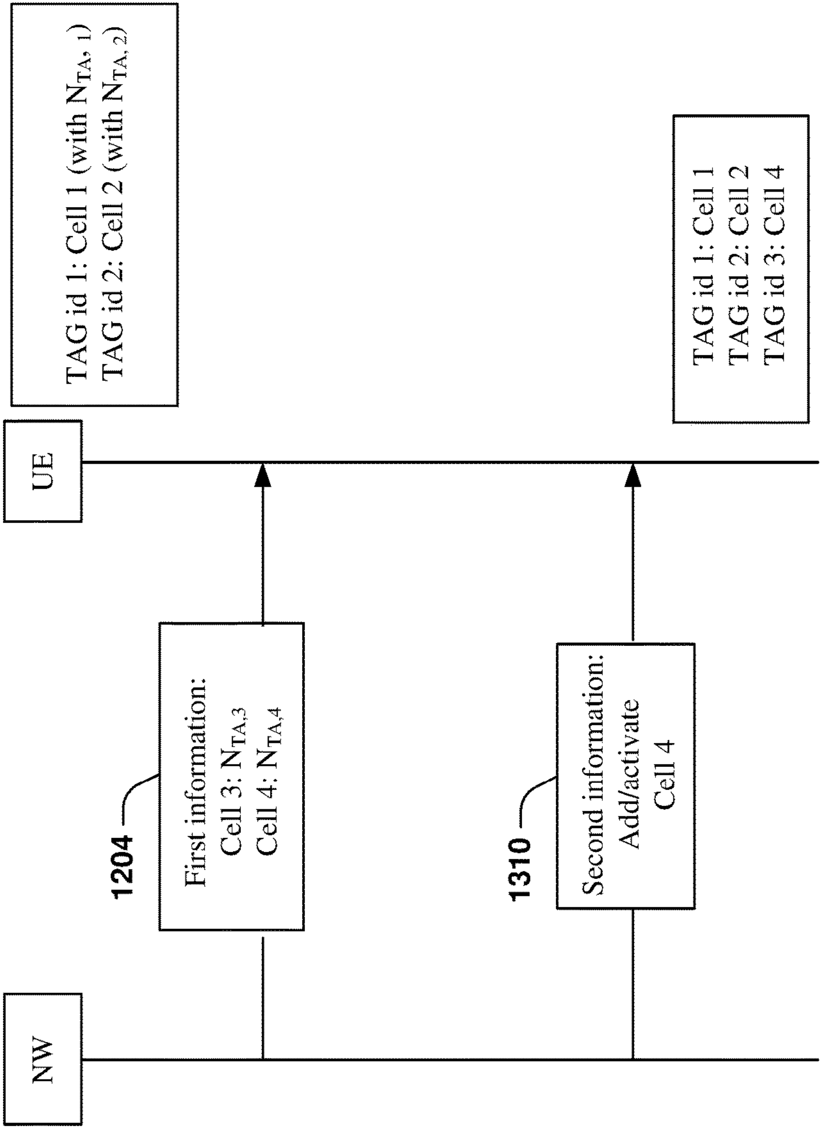
FIG. 13 is a diagram illustrating an exemplary scenario associated with a UE and a network according to one exemplary embodiment.

FIG. 13 illustrates a scenario 1300 associated with the UE and the NW. In the scenario 1300, after receiving the first information 1204 (shown in and/or described with respect to FIG. 12), the UE may receive a second information 1310. The second information 1310 may indicate to the UE (e.g., instruct the UE) to add/activate Cell 4. Cell 4 may be indicated (in the first information 1204, for example) as being associated with the timing advance value $N_{TA,4}$, which may be different from the timing advances (e.g., $N_{TA,1}$ and $N_{TA,2}$) of TAG id 1 and TAG id 2. The UE may assign and/or configure Cell 4 into a TAG with a TAG id (e.g., TAG id 3 in the scenario 1300) different from the TAG id 1 and TAG id 2. Alternatively and/or additionally, the first information 1204 or the second information 1310 may indicate a TAG id for Cell 4, wherein the UE may assign and/or configure Cell 4 into a TAG with the TAG id (e.g., TAG id 3) indicated by the first information 1204 or the second information 1310.

Figure 14:
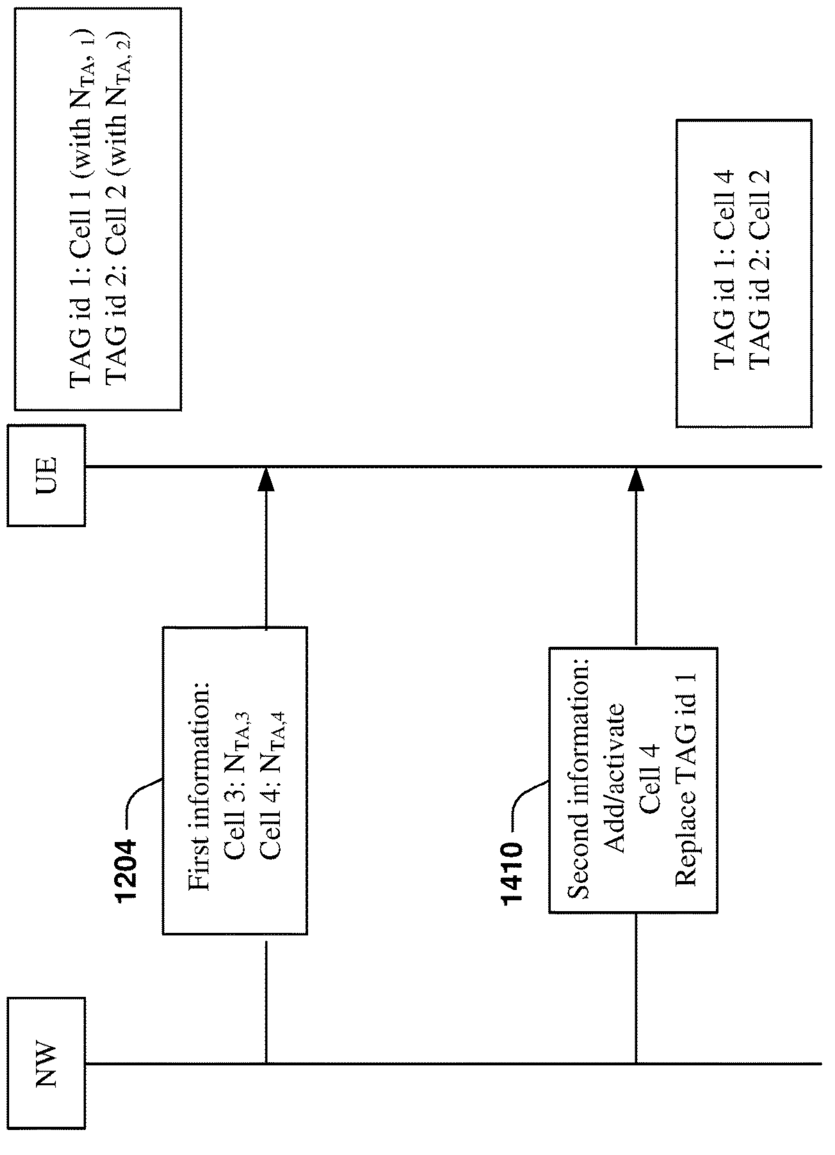
FIG. 14 is a diagram illustrating an exemplary scenario associated with a UE and a network according to one exemplary embodiment.

FIG. 14 illustrates a scenario 1400 associated with the UE and the NW. In the scenario 1400, after receiving the first information 1204 (shown in and/or described with respect to FIG. 12), the UE may receive a second information 1410. The second information 1410 may indicate to the UE (e.g., instruct the UE) to replace one or more cells associated with TAG id 1 with added/activated Cell, Cell 4. Embodiments are contemplated in which the replacement of the one or more cells associated with TAG id 1 with Cell 4 is indicated in the first information 1204. In response to the second information 1410, the UE may add Cell 4 and assign/configure Cell 4 with TAG id 1 (e.g., Cell 4 may be added in the first TAG with TAG id 1). The UE may release/remove/deactivate Cell 1 (and/or one or more other Cells in the original TAG associated with TAG id 1) in response to the second information 1410.

Figure 15:
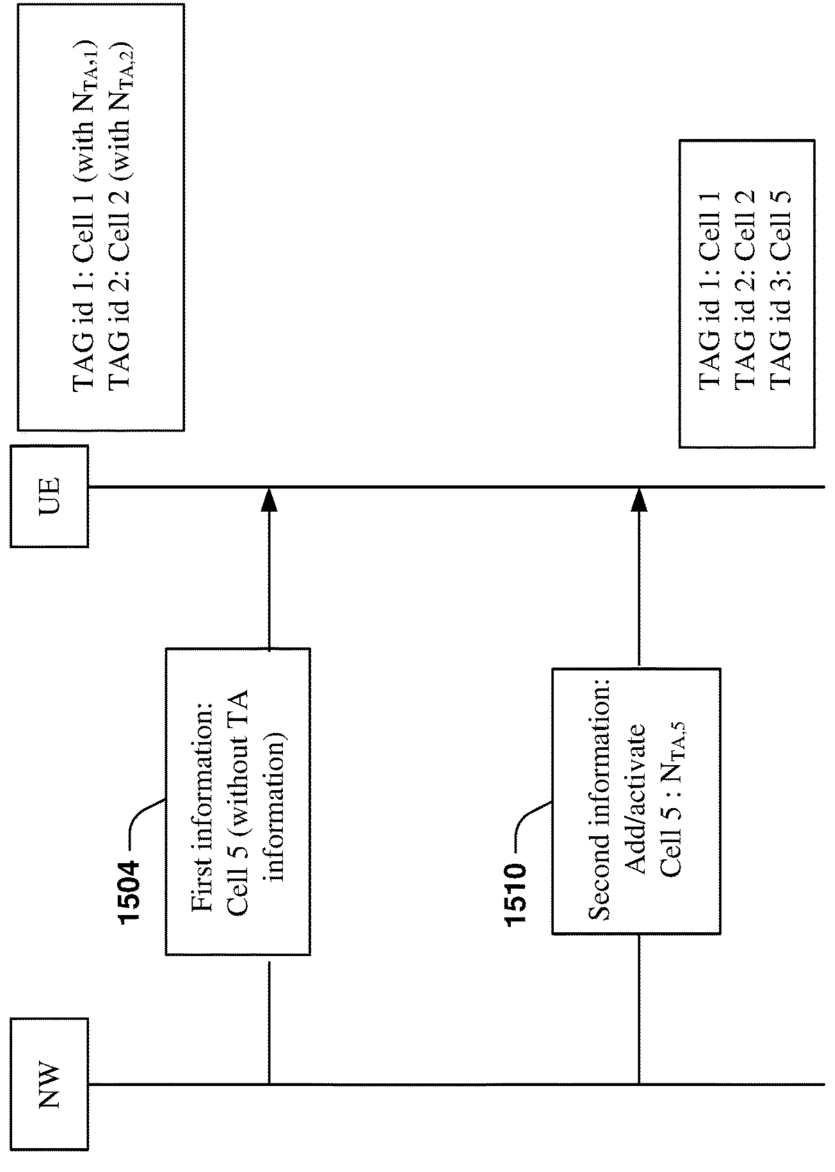
FIG. 15 is a diagram illustrating an exemplary scenario associated with a UE and a network according to one exemplary embodiment.

FIG. 15 illustrates a scenario 1500 associated with a UE and a network "NW". The UE may be configured with and/or may activate Cell 1 and Cell 2. In some examples, the UE performs communication with the NW via Cell 1 and Cell 2. The UE may be configured with a first TAG with TAG id 1 and a first timing advance value $N_{TA,1}$. The UE may be configured with a second TAG with TAG id 2 and a second timing advance value $N_{TA,2}$. Cell 1 is associated with the first TAG and/or the first timing advance value $N_{TA,1}$. Cell 2 is associated with the second TAG and/or the second timing advance value $N_{TA,2}$. The NW transmits a first information 1504 indicating a configuration (e.g., a Cell configuration) of a Cell 5. In some examples, the first information 1504 does not indicate $N_{TA}$ of Cell 5 and/or does not indicate TAG id of Cell 5. The NW may transmit a second information 1510 indicating adding/activating Cell 5. The second information 1510 may provide a timing advance value (e.g., $N_{TA,5}$) of Cell 5. In response to the second information 1510, the UE configures/adds Cell 5 (as a SCell, for example) and assign Cell 5 in a TAG with TAG id 3 (e.g., the UE may add Cell 5 in the TAG with TAG id 3). Alternatively and/or additionally, the second information 1510 may indicate (e.g., comprise) a TAG id (e.g., TAG id 3) associated with Cell 5 (e.g., the NW may provide an indication of TAG id 3 for Cell 5).

Figure 16:
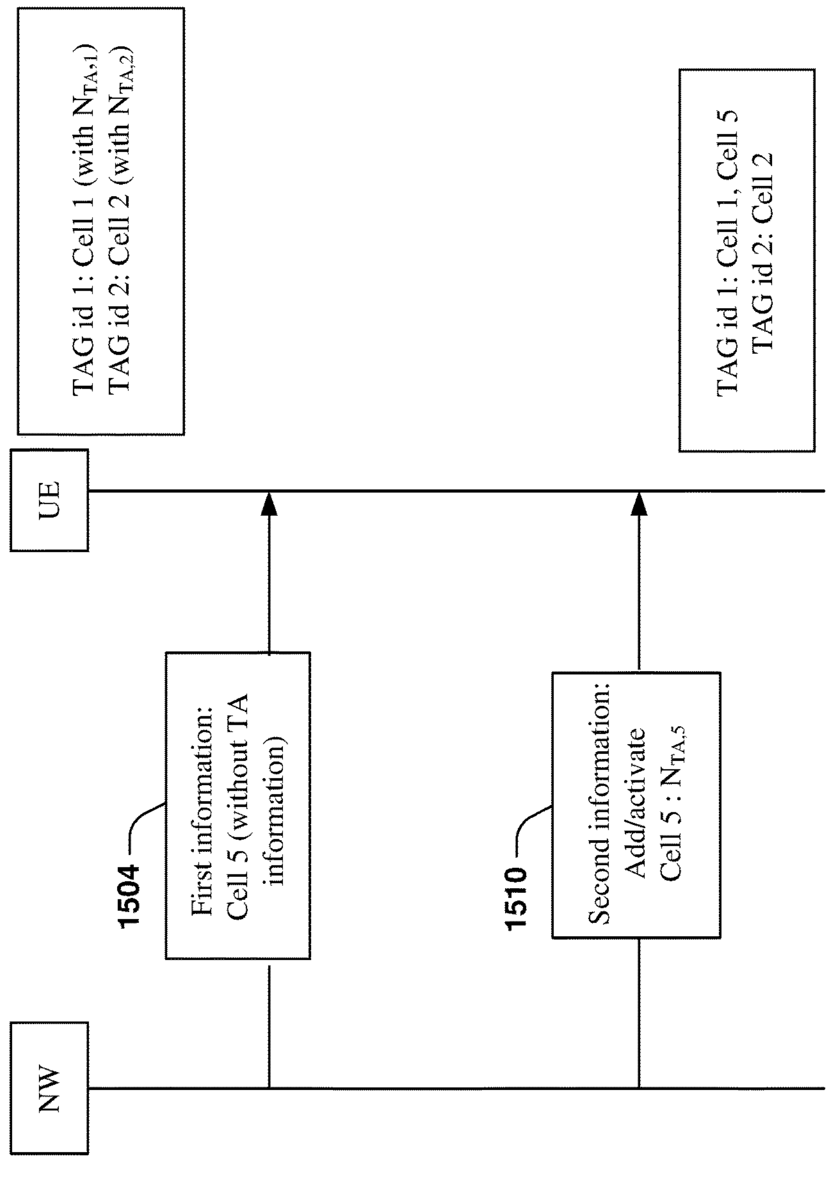
FIG. 16 is a diagram illustrating an exemplary scenario associated with a UE and a network according to one exemplary embodiment.

In some examples, the $N_{TA,5}$ may have the same value as $N_{TA,1}$ (associated with Cell 1 and/or TAG id 1, for example). FIG. 16 illustrates a scenario 1600 in which the $N_{TA,5}$ has the same value as $N_{TA,1}$. In the scenario 1600, the UE may (i) add/activate Cell 5 in the first TAG with TAG id 1 (based on $N_{TA,5}$ being the same value as $N_{TA,1}$, and/or based on $N_{TA,1}$ being associated with TAG id 1, for example) and/or (ii) apply the $N_{TA,5}$ as the timing advance value of Cell 5.

Figure 17:
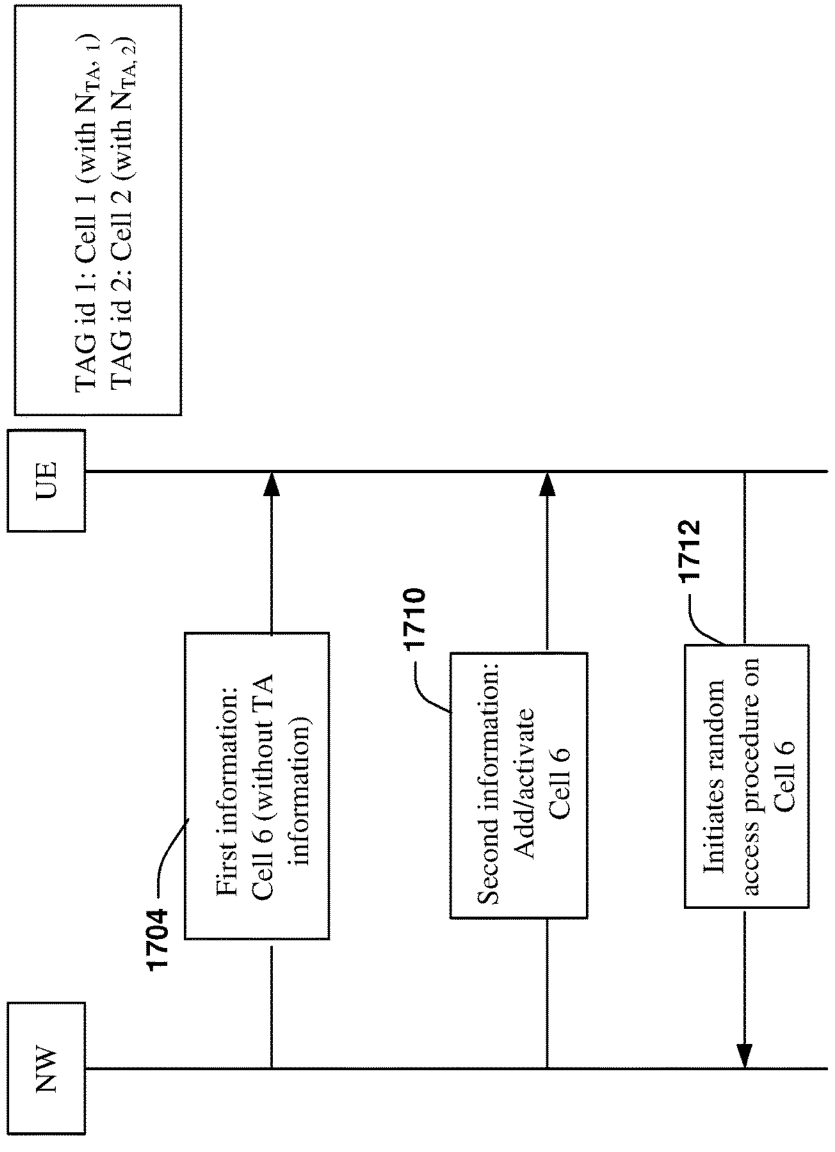
FIG. 17 is a diagram illustrating an exemplary scenario associated with a UE and a network according to one exemplary embodiment.

FIG. 17 illustrates a scenario 1700 associated with a UE and a network "NW". The UE may be configured with and/or may activate Cell 1 and Cell 2. In some examples, the UE performs communication with the NW via Cell 1 and Cell 2. The UE may be configured with a first TAG with TAG id 1 and a first timing advance value $N_{TA,1}$. The UE may be configured with a second TAG with TAG id 2 and a second timing advance value $N_{TA,2}$. Cell 1 is associated with the first TAG and/or the first timing advance value $N_{TA,1}$. Cell 2 is associated with the second TAG and/or the second timing advance value $N_{TA,2}$. The NW transmits a first information 1704 indicating Cell 6 (e.g., the first information 1704 indicates a cell configuration, such as one or more parameters in a Serving Cell configuration, of Cell 6). In some examples, the first information 1704 does not provide timing advance information of Cell 6. The NW transmits a second information 1710 indicating to the UE (e.g., instructing the UE) to add/activate Cell 6. In some examples, the second information 1710 does not provide timing advance information of Cell 6. In response to the second information 1710, the UE may initiate 1712 a random access procedure on Cell 6 (to obtain a TA associated with Cell 6, for example). Random access resources and/or configuration associated with the random access procedure on Cell 6 may be provided in the first information 1704 and/or the second information 1710. Alternatively and/or additionally, the UE may initiate 1712 the random access procedure on Cell 6 if (and/or when) a TAG (indicated in the first information 1704 and/or the second information 1710, for example) does not have a valid $N_{TA}$ and/or if (and/or when) a time alignment timer (e.g., timeAlignmentTimer) of the TAG is not running.

In some examples, embodiments disclosed herein, such as embodiments described with respect to each of Embodiments 1-12, may be implemented independently and/or separately. Alternatively and/or additionally, a combination of embodiments described herein, such as embodiments described with respect to one, some and/or all of Embodiments 1-12, may be implemented. Alternatively and/or additionally, a combination of embodiments described herein, such as embodiments described with respect to one, some and/or all of Embodiments 1-12, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, a mobility procedure may be used to add, release and/or switch one or more SCells of the UE. In some examples, the mobility procedure may not add, release or switch a PCell and/or a PSCell of the UE.

Alternatively and/or additionally, a mobility procedure may comprise the UE triggering and/or generating a message, and/or transmitting the message to a target cell (e.g., a PCell, a PSCell, a neighboring cell or a SCell). The mobility procedure may comprise the UE initiating a random access procedure (e.g., a contention-free random access procedure) on the target cell. The random access procedure may be initiated in response to the message becoming available for transmission. The message may indicate a completion of the mobility procedure. The mobility procedure may be used to switch the a PCell (or a PSCell) of the UE to the target cell. The UE may consider the mobility procedure to be completed in response to a completion of the random access procedure. The UE may consider the mobility procedure to be completed in response to receiving a positive acknowledgement associated with the message (from the target cell, for example). The message may be a mobility completion message. In some examples, the mobility completion message may not comprise a RRC message. The mobility completion message may comprise a MAC CE. The mobility completion message may be transmitted via a Physical Uplink Control Channel (PUCCH) or Physical Uplink Shared Channel (PUSCH) transmission.

In some examples, a mobility procedure (e.g., a L1/L2 mobility procedure) may comprise a Serving Cell providing first information to a UE (e.g., the first information discussed with respect to one, some and/or all of Embodiments 1-12), wherein the first information provides (e.g., indicates) a configuration (e.g., a cell configuration) associated with a target cell. The configuration may comprise cell addition information and/or beam information associated with the target cell. The first information may be a dedicated signaling to the UE. The source cell may provide second information (e.g., the second information discussed with respect to one, some and/or all of Embodiments 1-12) to the UE indicating initiation of a mobility procedure to the target cell. The mobility procedure may comprise a random access procedure, one or more PUSCH transmissions and/or beam/

TCI state activation. In some examples, the second information does not comprise RRC signaling and/or RRC messages. The second information may be a L1 (e.g., Downlink control information) or a L2 (e.g., MAC CE) message. The first information and the second information may be transmitted in different signaling and/or timings. In some examples, the UE may not initiate the mobility procedure to the target cell in response to the first information (e.g., in response to reception of the first information). The UE may transmit a mobility completion message to the target cell indicating a completion of the mobility procedure. Alternatively and/or additionally, the target cell may transmit an acknowledgement to the UE indicating completion of the mobility procedure. The UE may consider the mobility procedure to be completed in response to acknowledgement from the target cell. Alternatively and/or additionally, the UE may consider the mobility procedure to be complete in response to transmission of the mobility completion message. Alternatively and/or additionally, the UE may consider the mobility procedure to be complete in response to completion of a random access procedure (e.g., a random access procedure associated with the mobility procedure, such as a random access procedure performed as part of the mobility procedure).

The mobility procedure may comprise part of handover procedure and/or a reconfiguration with sync procedure.

A completion of a mobility procedure may correspond to a completion of a random access procedure associated with the mobility procedure. Alternatively and/or additionally, the completion of the mobility procedure may correspond to a transmission of a mobility completion message (to the target cell, for example). Alternatively and/or additionally, the completion of the mobility procedure may correspond to a reception of an acknowledgement of the mobility completion message (from the target cell, for example).

In some examples, the mobility procedure is not a reconfiguration with sync (e.g., not a Layer-3 handover).

With respect to one or more embodiments herein, the first information may be a RRC message (e.g., a RRCReconfiguration message).

The first information may comprise UL and/or DL resource configuration associated with the target cell (and/or one or more cells to be added as SCell when initiating or completing the mobility procedure).

The first information may comprise ServingCellConfigCommon of the target cell and the one or more cells. The one or more cells may be candidate Serving Cells for MCG or SCG of the UE.

With respect to one or more embodiments herein, the second information is not a RRC message (e.g., the second information is not a RRC signaling). The second information may comprise a Physical Downlink Control Channel (PDCCH) signaling (e.g., a DCI) and/or a MAC CE. The second information may indicate to the UE (e.g., instruct the UE) to initiate a mobility procedure adding/activating the one or more cells (and/or a subset of the one or more cells). Alternatively and/or additionally, the second information may indicate to the UE (e.g., instruct the UE) to add/activate the one or more cells (and/or a subset of the one or more cells) (e.g., the second information may instruct the UE to add/activate the one or more cells and/or the subset of the one or more cells as SCells and/or as PCells). The second information may indicate one or more cells (e.g. via an index indicated in the first information and/or via a SCell index) to be added, switched and/or released (via a mobility procedure, for example). In response to adding/activating the one or more cells (and/or the subset of the one or more cells) (e.g., in response to completion of add/activating the one or more cells and/or the subset), the UE may consider the one or more cells (and/or the subset of the one or more cells) to be Serving Cells.

The second information may comprise sCellToAddModList and/or sCellToReleaseList (in the cell information, for example). The second information may indicate (e.g., may comprise) one or more cell lists indicating cells (e.g., SCell) to be added/modified/released when initiating or completing the mobility procedure.

The second information may not be (and/or may not comprise) a SCell Activation/Deactivation MAC CE.

With respect to one or more embodiments herein, the L1/L2 handover procedure may be a mobility procedure. With respect to one or more embodiments herein, the L1/L2 handover (HO) may not be a reconfiguration with sync procedure. The mobility procedure may be a procedure for L1/L2-centric inter-cell mobility.

With respect to one or more embodiments herein, the mobility procedure may comprise the UE transmitting UL data and/or control information to the target cell. The UL data may comprise information associated with the UE (e.g., Cell Radio Network Temporary Identifier (C-RNTI) MAC CE). The UL data may be transmitted via PUSCH. The UL control information may be transmitted via PUCCH.

With respect to one or more embodiments herein, the one or more cells may not comprise a PCell or a target cell. The second information may indicate both a target cell and additionally the one or more cells (via the cell information, for example) to the UE, where the UE initiates a mobility procedure and consider the target cell to be PCell in response to completion (or initiation) of the mobility procedure.

With respect to one or more embodiments herein, to add a cell (e.g., a candidate Serving Cell) associated with an identity (e.g., SCellIndex), the UE adds the cell as SCell and applies a configuration (e.g., a cell configuration) of the cell. The configuration of the cell may be indicated in the first information (e.g., the configuration of the cell may be indicated via one or more parameters in sCellConfigCommon and sCellConfigDedicated).

With respect to one or more embodiments herein, the index/identity (provided in the first information, for example) may not be ServCellIndex. In some examples, the index/identity may not be sCellIndex.

With respect to one or more embodiments herein, the cell information (in the second information, for example) may indicate one or more cells to be added (in a MCG and/or SCG) in response to receiving the second information.

With respect to one or more embodiments herein, a current and/or existing TAG may be a TAG (e.g., configured with a TAG id) that is associated with the UE before receiving the first information and/or the second information. Alternatively and/or additionally, a current and/or existing TAG may be a TAG (e.g., configured with a TAG id) that is associated with the UE after receiving the first information and/or the second information and/or after completing a mobility procedure.

With respect to one or more embodiments herein, a current and/or existing TAG id may be a TAG id of a TAG that is associated with the UE before receiving the first information and/or the second information. Alternatively and/or additionally, a current and/or existing TAG id may be a TAG id of a TAG that is associated with the UE after receiving the first information and/or the second information and/or after completing a mobility procedure.

With respect to one or more embodiments herein, the TAG of a cell of the one or more cells may be indicated in the first information and/or the second information. The timing advance information of a cell of the one or more cells may be indicated in the first information and/or the second information.

With respect to one or more embodiments herein, a current and/or existing cell may be a cell that is configured, activated and/or added (by the UE, for example) before receiving the second information and/or before initiating the mobility procedure. The current and/or existing cell may be a SCell (or a PCell). The current and/or existing cell may be indicated in the first information and/or the second information. The UE may not release/remove/deactivate the current and/or existing cell (in response to receiving the second information and/or in response to initiating or completing the mobility procedure) if (and/or when) the cell is indicated in the second information.

With respect to one or more embodiments herein, to add/activate a cell associated with a TAG, the UE may configure the cell and/or apply the cell with a TAG id associated with the TAG. The UE may consider the cell to be a Serving Cell (e.g., an activated Serving Cell, a SCell and/or a PCell) associated with the TAG.

With respect to one or more embodiments herein, the TAG may not comprise a PCell or a PSCell. In some examples, the TAG may not be associated with a TAG id equal to 0.

With respect to one or more embodiments herein, a UE applying a $N_{TA}$ to and/or for a cell may mean that when the UE performs UL transmission on the cell, the UL transmission uses the $N_{TA}$ (in addition to using an offset, $N_{TA,offset}$, for example) as a timing advance between downlink and uplink (e.g., the timing advance may be determined based upon the $N_{TA}$ and the $N_{TA,offset}$, such as where the timing advance is equal to a sum of the $N_{TA}$ and the $N_{TA,offset}$).

Alternatively and/or additionally, the UE applying a $N_{TA}$ to and/or for a cell may mean that the UE starts an uplink frame for transmission before the start of a corresponding downlink frame by an offset derived based on the value of the $N_{TA}$.

With respect to one or more embodiments herein, the $N_{TA}$ of one or more cells may be indicated and/or configured (by the first information and/or the second information, for example) as a value (e.g., a fixed value), such as value 0 or a non-zero value (e.g., $N_{TA}$ may be indicated and/or configured to be a value, such as a fixed value, equal to 0 or a non-zero value). Alternatively and/or additionally, the $N_{TA}$ may be indicated and/or configured via an index (e.g., ServCellindex or SCellindex) of a Cell (e.g., a different cell different from the one or more cells). For example, the UE may be configured with the $N_{TA}$ via being provided with the index. In an example in which the cell is the different cell different from the one or more cells, the $N_{TA}$ of the one or more cells has the same value as $N_{TA}$ of the different cell.

In some embodiments, in the present disclosure, one, some and/or all instances of the term "identity" may be replaced with and/or used interchangeably with the term "ID" and/or the term "id".

In some embodiments, in the present disclosure, one, some and/or all instances of the term "TAG id" may be replaced with and/or used interchangeably with the term "TAG ID", the term "TAG-Id" and/or the term "TAG identity".

In some embodiments, in the present disclosure, one, some and/or all instances of the term "Timing Advance" and/or the term "TA" may be replaced with (and/or supplemented with) the term "Time Alignment".

In some embodiments, in the present disclosure, one, some and/or all instances of the term "timing advance group" and/or the term "TAG" may be replaced with (and/or supplemented with) the term "Time Alignment Group".

One, some and/or all of the foregoing examples, concepts, techniques and/or embodiments can be formed and/or combined to a new embodiment.

Figure 18:
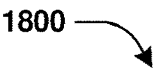
FIG. 18 is a flow chart according to one exemplary embodiment.
Figure 18:
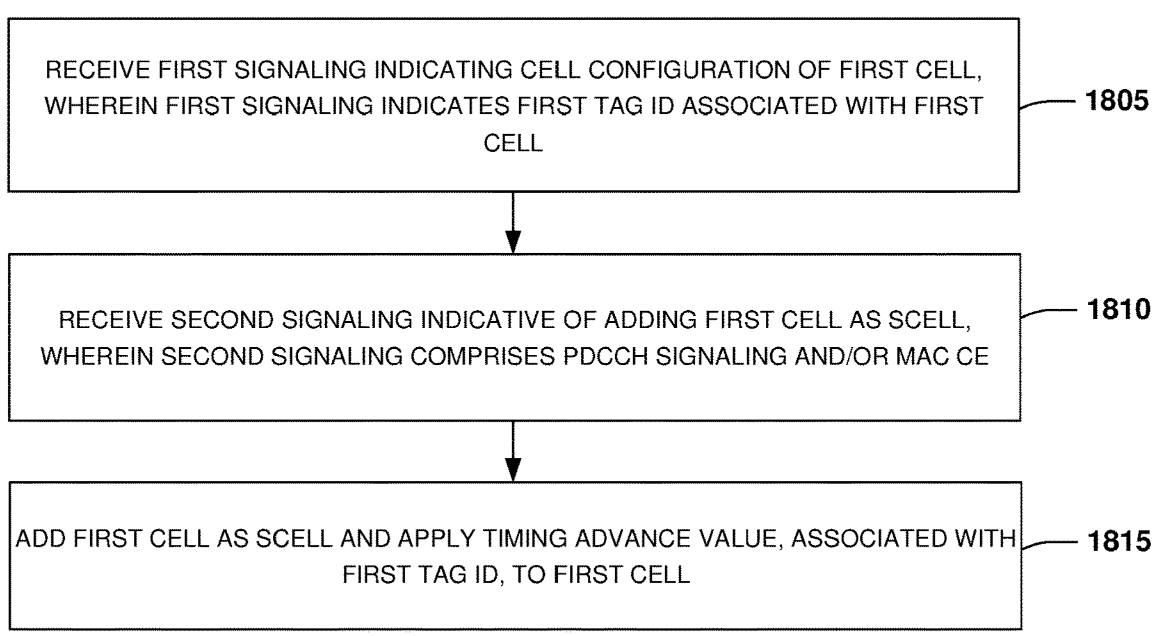

FIG. 18 is a flow chart 1800 according to one exemplary embodiment from the perspective of a UE. In step 1805, the UE receives a first signaling indicating a cell configuration (e.g., ServingCellconfig and/or one or more parameters in sCellConfigCommon and/or sCellConfigDedicated) of a first cell. The first signaling indicates a first TAG id associated with the first cell. In step 1810, the UE receives a second signaling indicative of adding the first cell as a SCell, wherein the second signaling comprises a PDCCH signaling and/or a MAC CE (e.g., the second signaling may be the PDCCH signaling or the MAC CE). For example, the second signaling may instruct the UE to add the first cell as a SCell. In step 1815, the UE (i) adds the first cell as a SCell and (ii) applies a timing advance value, associated with the first TAG id, to the first cell. For example, the UE may apply the timing advance value associated with the first TAG id to the first cell based on the first signaling being indicative of the first TAG id associated with the first cell (e.g., based on the first signaling indicating that the first TAG id is associated with the first cell).

Referring back to FIGS. 3 and 4, in one exemplary embodiment of a UE, the device 300 includes a program code 312 stored in the memory 310. The CPU 308 may execute program code 312 to enable the UE (i) to receive a first signaling indicating a cell configuration of a first cell, wherein the first signaling indicates a first TAG id associated with the first cell, (ii) to receive a second signaling indicative of adding the first cell as a SCell, wherein the second signaling comprises a PDCCH signaling and/or a MAC CE, and (iii) to (A) add the first cell as a SCell and (B) apply a timing advance value, associated with the first TAG id, to the first cell. Furthermore, the CPU 308 can execute the program code 312 to perform one, some and/or all of the above-described actions and steps and/or others described herein.

Figure 19:
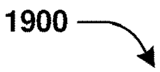
FIG. 19 is a flow chart according to one exemplary embodiment.
Figure 19:
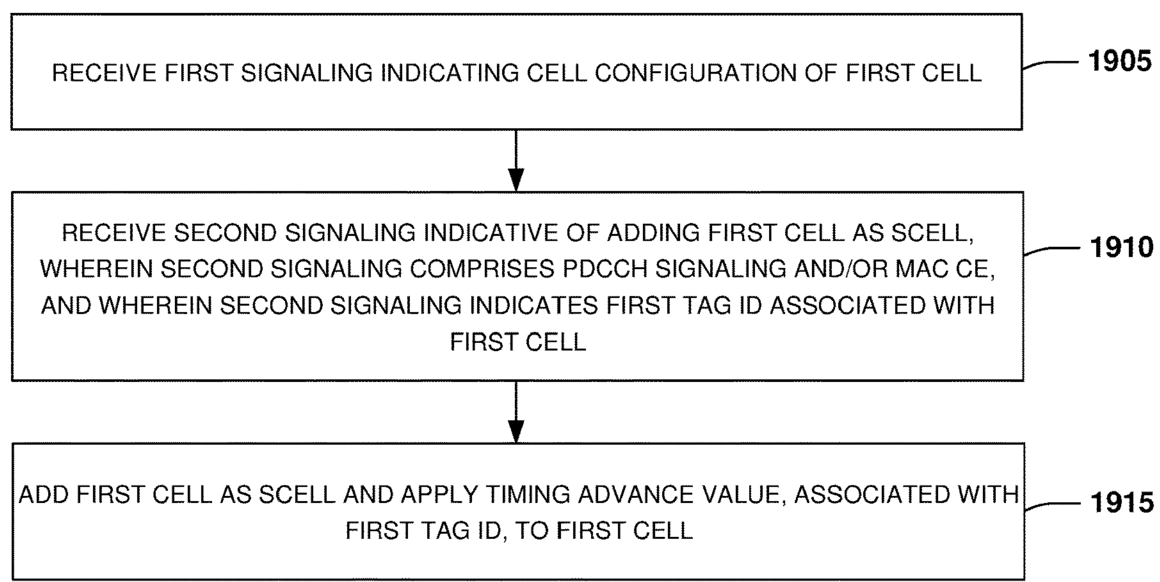

FIG. 19 is a flow chart 1900 according to one exemplary embodiment from the perspective of a UE. In step 1905, the UE receives a first signaling indicating a cell configuration (e.g., ServingCellconfig and/or one or more parameters in sCellConfigCommon and/or sCellConfigDedicated) of a first cell. In step 1910, the UE receives a second signaling indicative of adding the first cell as a SCell, wherein the second signaling comprises a PDCCH signaling and/or a MAC CE (e.g., the second signaling may be the PDCCH signaling or the MAC CE), and wherein the second signaling indicates a first TAG id associated with the first cell. For example, the second signaling may instruct the UE to add the first cell as a SCell. In step 1915, the UE (i) adds the first cell as a SCell and (ii) applies a timing advance value, associated with the first TAG id, to the first cell. For example, the UE may apply the timing advance value associated with the first TAG id to the first cell based on the second signaling being indicative of the first TAG id associated with the first cell (e.g., based on the second signaling indicating that the first TAG id is associated with the first cell).

Referring back to FIGS. 3 and 4, in one exemplary embodiment of a UE, the device 300 includes a program code 312 stored in the memory 310. The CPU 308 may execute program code 312 to enable the UE (i) to receive a first signaling indicating cell configuration of a first cell, (ii) to receive a second signaling indicative of adding the first cell as a SCell, wherein the second signaling comprises a PDCCH signaling and/or a MAC CE, and wherein the second signaling indicates a first TAG id associated with the first cell, and (iii) to (A) add the first cell as a SCell and (B) apply a timing advance value, associated with the first TAG id, to the first cell. Furthermore, the CPU 308 can execute the program code 312 to perform one, some and/or all of the above-described actions and steps and/or others described herein.

With respect to FIGS. 18 and 19, in one embodiment, the UE releases/removes/deactivates a second cell associated with the first TAG id in response to receiving the second signaling, wherein the second cell is not indicated in the second signaling. For example, the UE may release/remove/deactivate the second cell based on the second signaling not being indicative of the second cell.

In one embodiment, adding the first cell as a SCell may comprise (i) adding the first cell to a set of SCells (e.g., a set of currently used and/or activated SCells) of the UE, (ii) activating the first cell, and/or (iii) considering the first cell to be a SCell. The UE may use the first cell (as a SCell, for example) after adding the first cell as a SCell.

In one embodiment, the UE adds the first cell as a SCell and/or applies the timing advance value to the first cell in response to the second signaling.

Figure 20:
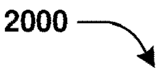
FIG. 20 is a flow chart according to one exemplary embodiment.
Figure 20:
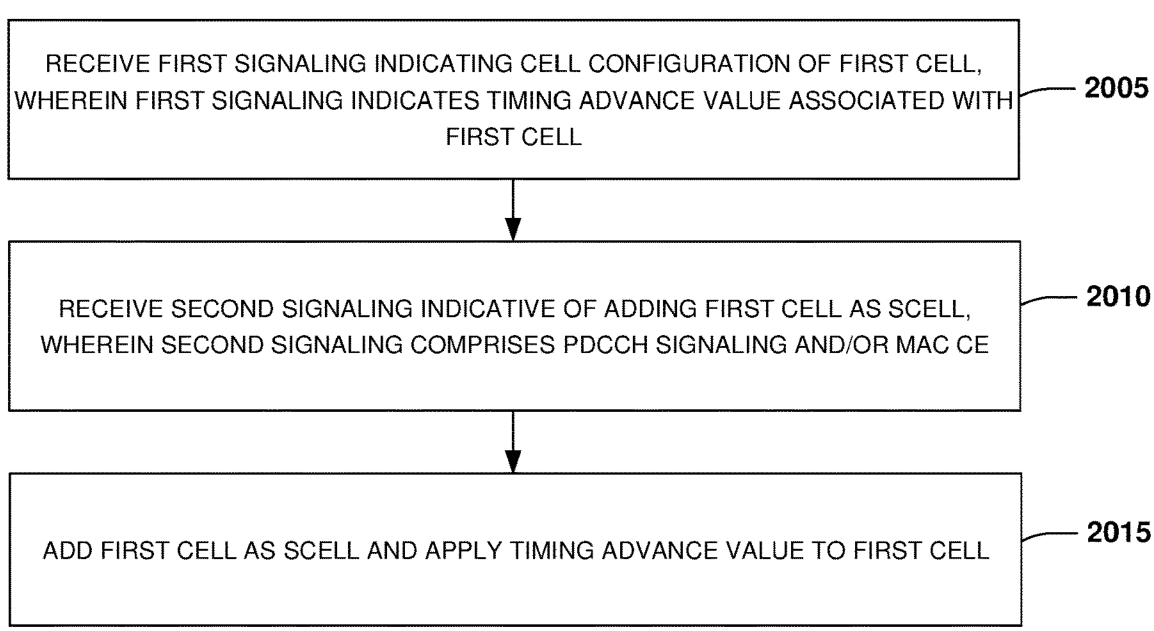

FIG. 20 is a flow chart 2000 according to one exemplary embodiment from the perspective of a UE. In step 2005, the UE receives a first signaling indicating a cell configuration (e.g., ServingCellconfig and/or one or more parameters in sCellConfigCommon and/or sCellConfigDedicated) of a first cell. The first signaling indicates a timing advance value associated with the first cell. In step 2010, the UE receives a second signaling indicative of adding the first cell as a SCell, wherein the second signaling comprises a PDCCH signaling and/or a MAC CE (e.g., the second signaling may be the PDCCH signaling or the MAC CE). For example, the second signaling may instruct the UE to add the first cell as a SCell. In step 2015, the UE (i) adds the first cell as a SCell and (ii) applies the timing advance value to the first cell. For example, the UE may apply the timing advance value to the first cell based on the first signaling being indicative of the timing advance value associated with the first cell (e.g., based on the first signaling indicating that the timing advance value is associated with the first cell).

Referring back to FIGS. 3 and 4, in one exemplary embodiment of a UE, the device 300 includes a program code 312 stored in the memory 310. The CPU 308 may execute program code 312 to enable the UE (i) to receive a first signaling indicating a cell configuration of a first cell, wherein the first signaling indicates a timing advance value associated with the first cell, (ii) to receive a second signaling indicative of adding the first cell as a SCell, wherein the second signaling comprises a PDCCH signaling and/or a MAC CE, and (iii) to (A) add the first cell as a SCell and (B) apply the timing advance value to the first cell. Furthermore, the CPU 308 can execute the program code 312 to perform one, some and/or all of the above-described actions and steps and/or others described herein.

Figure 21:
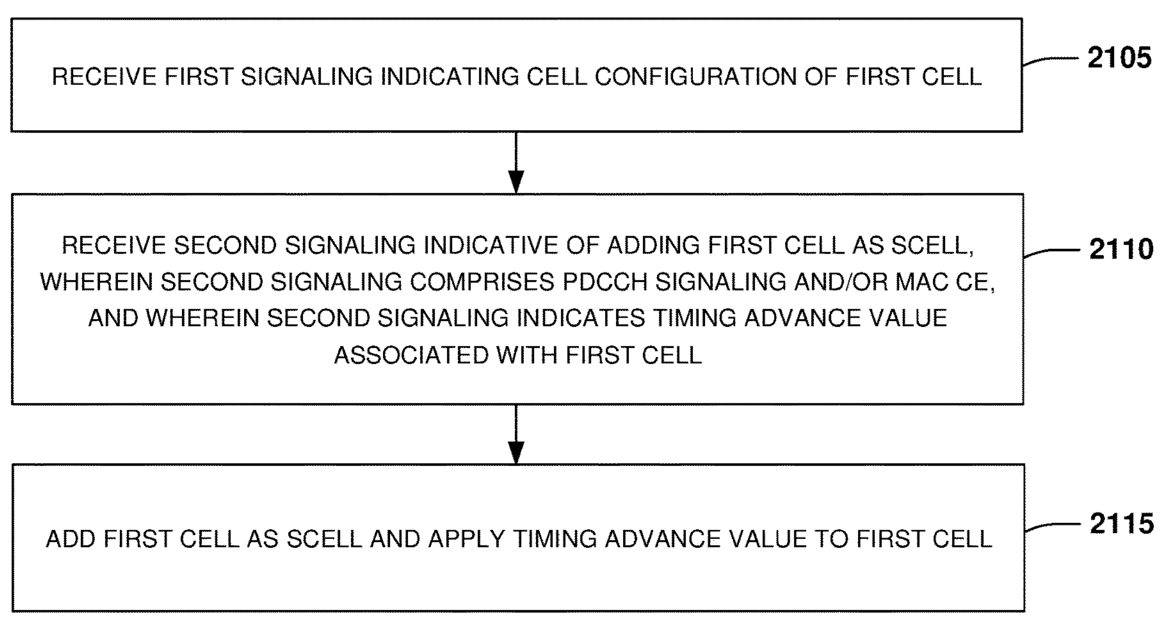
FIG. 21 is a flow chart according to one exemplary embodiment.

FIG. 21 is a flow chart 2100 according to one exemplary embodiment from the perspective of a UE. In step 2105, the UE receives a first signaling indicating a cell configuration (e.g., ServingCellconfig and/or one or more parameters in sCellConfigCommon and/or sCellConfigDedicated) of a first cell. In step 2110, the UE receives a second signaling indicative of adding the first cell as a SCell, wherein the second signaling comprises a PDCCH signaling and/or a MAC CE (e.g., the second signaling may be the PDCCH signaling or the MAC CE), and wherein the second signaling indicates a timing advance value associated with the first cell. For example, the second signaling may instruct the UE to add the first cell as a SCell. In step 2115, the UE (i) adds the first cell as a SCell and (ii) applies the timing advance value to the first cell. For example, the UE may apply the timing advance value to the first cell based on the second signaling being indicative of the timing advance value associated with the first cell (e.g., based on the second signaling indicating that the timing advance value is associated with the first cell).

Referring back to FIGS. 3 and 4, in one exemplary embodiment of a UE, the device 300 includes a program code 312 stored in the memory 310. The CPU 308 may execute program code 312 to enable the UE (i) to receive a first signaling indicating a cell configuration of a first cell, (ii) to receive a second signaling indicative of adding the first cell as a SCell, wherein the second signaling comprises a PDCCH signaling and/or a MAC CE, and wherein the second signaling indicates a timing advance value associated with the first cell, and (iii) to (A) add the first cell as a SCell and (B) apply the timing advance value to the first cell. Furthermore, the CPU 308 can execute the program code 312 to perform one, some and/or all of the above-described actions and steps and/or others described herein.

With respect to FIGS. 20 and 21, in one embodiment, the first signaling indicates a TAG id associated with the first cell.

In one embodiment, the second signaling indicates a TAG id associated with the first cell.

In one embodiment, the UE adds the first cell in a TAG associated with the TAG id (indicated by the first signaling and/or the second signaling).

In one embodiment, the UE releases/removes/deactivates a second cell in the TAG associated with the TAG id, wherein the second cell is not indicated in the second signaling. For example, the UE may release/remove/deactivate the second cell (in response to receiving the second signaling, for example) based on the second signaling not being indicative of the second cell.

In one embodiment, adding the first cell as a SCell may comprise (i) adding the first cell to a set of SCells (e.g., a set of currently used and/or activated SCells) of the UE, (ii) activating the first cell, and/or (iii) considering the first cell to be a SCell. The UE may use the first cell (as a SCell, for example) after adding the first cell as a SCell.

In one embodiment, the UE adds the first cell as a SCell and/or applies the timing advance value to the first cell in response to the second signaling.

With respect to FIGS. 18-21, in one embodiment, the first signaling comprises a RRC message.

In one embodiment, before the UE receives the second signaling, the first cell is a non-serving cell (of the UE, for example) and/or is a neighboring cell of the UE.

In one embodiment, the UE adds the first cell as a SCell by performing SCell addition.

In one embodiment, the UE adds the first cell as a SCell by applying the cell configuration, of the first cell, indicated in the first signaling.

In one embodiment, the second signaling indicates an index/identity associated with the first cell.

In one embodiment, the second signaling is indicative of a third cell, wherein the UE switches a SpCell of the UE to the third cell in response to the second signaling.

Figure 22:
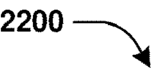
FIG. 22 is a flow chart according to one exemplary embodiment.
Figure 22:
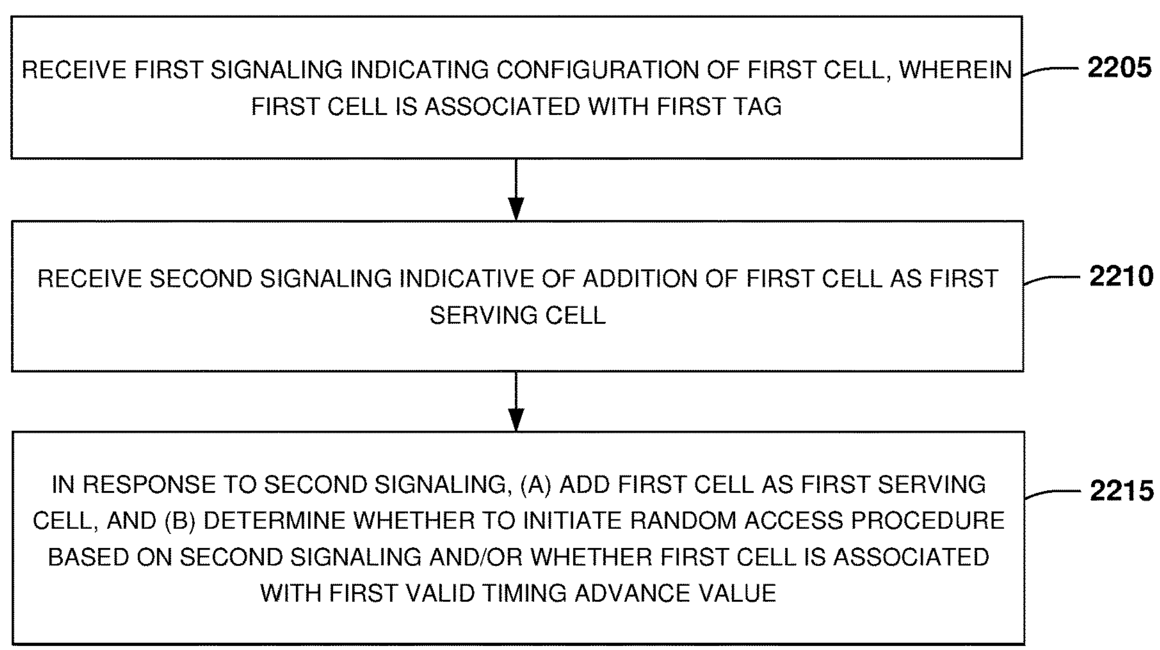

FIG. 22 is a flow chart 2200 according to one exemplary embodiment from the perspective of a UE. In step 2205, the UE receives a first signaling indicating a configuration of a first cell, wherein the first cell is associated with a first TAG. The configuration may correspond to a cell configuration (e.g., ServingCellconfig and/or one or more parameters in sCellConfigCommon and/or sCellConfigDedicated) of the first cell. In step 2210, the UE receives a second signaling indicative of addition of the first cell as a first Serving Cell. For example, the second signaling may instruct the UE to add the first cell as the first Serving Cell. Alternatively and/or additionally, the second signaling may be used to add the first cell as the first Serving Cell. In step 2215, in response to the second signaling, the UE (i) adds the first cell as the first Serving Cell, and (ii) determines whether to initiate a random access procedure based on the second signaling and/or whether the first cell is associated with a first valid timing advance value.

In one embodiment, the second signaling comprises a PDCCH signaling and/or a MAC CE. In some examples, the second signaling may be the PDCCH signaling or the MAC CE.

In one embodiment, it may be determined that the first valid timing advance value is valid based on a determination that a time alignment timer (e.g., timeAlignmentTimer) associated with the first valid timing advance value is running. The time alignment timer may correspond to a time alignment timer of a TAG (e.g., the first TAG) associated with the first valid timing advance value. In some examples, a timing advance value may be determined to be invalid based on a determination that a time alignment timer (e.g., timeAlignmentTimer) associated with the timing advance value is not running.

In one embodiment, the UE determines whether the first cell is associated with the first valid timing advance value by (i) determining, based on the first signaling and/or the second signaling, a first timing advance value associated with the first cell (e.g., the first signaling and/or the second signaling may be indicative of the first timing advance value and/or a TAG, such as the first TAG, associated with the first timing advance value), and/or (ii) determining whether the first timing advance value is valid based on whether a time alignment timer (e.g., timeAlignmentTimer) associated with the first timing advance value is running. The first timing advance value may be determined to be valid (and thus, the UE may determine that the first cell is associated with the first valid timing advance value, for example) based on a determination that the time alignment timer is running. The first timing advance value may be determined to be invalid (and thus, the UE may determine that the first cell is not associated with a first valid timing advance value, for example) based on a determination that the time alignment timer is not running.

In one embodiment, the first signaling and/or the second signaling are indicative of the first valid timing advance value and/or a TAG (e.g., the first TAG) associated with the first valid timing advance value.

In one embodiment, the first signaling and/or the second signaling are configured (and/or allowed) to indicate the first valid timing advance value and/or a TAG (e.g., the first TAG) associated with the first valid timing advance value.

In one embodiment, an entity (e.g., a network) that transmits the first signaling and/or the second signaling is configured (and/or allowed) to include, in the first signaling and/or the second signaling, an indication of the first valid timing advance value and/or a TAG (e.g., the first TAG) associated with the first valid timing advance value.

In one embodiment, the UE applies the first valid timing advance value associated with the first cell in response to the second signaling.

In one embodiment, the UE applies the first valid timing advance value associated with the first cell after adding the first cell as the first Serving Cell.

In one embodiment, the UE initiates the random access procedure based on a determination that no valid timing advance value is associated with the first cell (and/or a determination that the first cell is not associated with the first valid timing advance value). For example, the determination that no valid timing advance value is associated with the first cell may be based on a determination that a timing advance value associated with the first cell is invalid (e.g., a time alignment timer associated with the timing advance value is not running).

In one embodiment, the UE initiates the random access procedure if (and/or when) no valid timing advance value is associated with the first cell (and/or the first cell is not associated with the first valid timing advance value).

In one embodiment, the UE does not initiate the random access procedure based on one or more conditions being met (e.g., based on a determination that the one or more conditions are met). For example, the UE does not initiate the random access procedure if (and/or when) the one or more conditions are met. The one or more conditions comprise a condition that the first cell is associated with the first valid timing advance value. The UE may determine that the first cell is associated with the first valid timing advance value by (i) determining a first timing advance value (e.g., the first valid timing advance value) associated with the first cell (e.g., the first timing advance value may be determined based on the first signaling and/or the second signaling), and/or (ii) determining that the first timing advance value is valid (and thus, determining that the first cell is associated with the first valid timing advance value, for example) based on a determination that a time alignment timer associated with the first timing advance value is running.

In one embodiment, the second signaling comprises an indication (e.g., an instruction) of whether to initiate the random access procedure. For example, if the indication in the second signaling indicates initiation of the random access procedure (e.g., if the indication instructs the UE to initiate the random access procedure), the UE may initiate the random access procedure based on the indication. Alternatively and/or additionally, if the indication in the second signaling indicates not initiating the random access procedure (e.g., if the indication instructs the UE not to initiate the random access procedure), the UE does not initiate the random access procedure based on the indication.

In one embodiment, adding the first cell as the first Serving Cell comprises applying the configuration of the first cell.

In one embodiment, the first signaling indicates a second configuration of a second cell, wherein the second cell is associated with a second TAG. The second configuration may correspond to a cell configuration (e.g., ServingCell-config and/or one or more parameters in sCellConfigCommon and/or sCellConfigDedicated) of the second cell.

In one embodiment, the second signaling is indicative of addition of the second cell as a second Serving Cell. For example, the second signaling may instruct the UE to add the second cell as the second Serving Cell. Alternatively and/or additionally, the second signaling may be used to add the second cell as the second Serving Cell (in addition to the being used to add the first cell as the first Serving Cell, for example). The UE adds the second cell as the second Serving Cell in response to the second signaling.

In one embodiment, the determination (in response to the second signaling) of whether to initiate the random access procedure is based on whether the second cell is associated with a second valid timing advance value.

In one embodiment, the UE determines whether the second cell is associated with the second valid timing advance value by (i) determining, based on the first signaling and/or the second signaling, a second timing advance value associated with the second cell (e.g., the first signaling and/or the second signaling may be indicative of the second timing advance value and/or a TAG, such as the second TAG, associated with the second timing advance value), and/or (ii) determining whether the second timing advance value is valid based on whether a time alignment timer (e.g., timeAlignmentTimer) associated with the second timing advance value is running. The second timing advance value may be determined to be valid (and thus, the UE may determine that the second cell is associated with the second valid timing advance value, for example) based on a determination that the time alignment timer is running. The second timing advance value may be determined to be invalid (and thus, the UE may determine that the second cell is not associated with a second valid timing advance value, for example) based on a determination that the time alignment timer is not running.

In one embodiment, the UE initiates the random access procedure based on a determination that (i) the first cell is associated with the first valid timing advance value (which may be determined by determining a first timing advance value associated with the first cell and/or determining that the first timing advance value is valid), and (ii) no valid timing advance value is associated with the second cell (which may be determined by determining a second timing advance value associated with the second cell and/or determining that the second timing advance value is invalid).

In one embodiment, the first signaling and/or the second signaling are indicative of a second valid timing advance value associated with the second cell and/or a TAG associated with the second valid timing advance value.

In one embodiment, the first signaling and/or the second signaling are configured (and/or allowed) to indicate the second valid timing advance value and/or a TAG associated with the second valid timing advance value.

In one embodiment, an entity (e.g., a network) that transmits the first signaling and/or the second signaling is configured (and/or allowed) to include, in the first signaling and/or the second signaling, an indication of the second valid timing advance value and/or a TAG associated with the second valid timing advance value.

In one embodiment, the first signaling and/or the second signaling are indicative of (i) the first valid timing advance value and the second valid timing advance value and/or (ii) a TAG associated with the first valid timing advance value and a TAG associated with the second valid timing advance value.

In one embodiment, the first signaling and/or the second signaling are configured (and/or allowed) to indicate (i) the first valid timing advance value and the second valid timing advance value and/or (ii) a TAG associated with the first valid timing advance value and a TAG associated with the second valid timing advance value.

In one embodiment, an entity (e.g., a network) that transmits the first signaling and/or the second signaling is configured (and/or allowed) to include, in the first signaling and/or the second signaling, an indication of (i) the first valid timing advance value and the second valid timing advance value and/or (ii) a TAG associated with the first valid timing advance value and a TAG associated with the second valid timing advance value.

In one embodiment, adding the first cell as the first Serving Cell may comprise (i) adding the first cell to a set of Serving Cells (e.g., a set of currently used and/or activated Serving Cells) of the UE, (ii) activating the first cell, and/or (iii) considering the first cell to be the first Serving Cell. The UE may use the first cell (as the first Serving Cell, for example) after adding the first cell as the first Serving Cell.

In one embodiment, adding the second cell as the second Serving Cell may comprise (i) adding the second cell to a set of Serving Cells (e.g., a set of currently used and/or activated Serving Cells) of the UE, (ii) activating the second cell, and/or (iii) considering the second cell to be the second Serving Cell. The UE may use the second cell (as the second Serving Cell, for example) after adding the second cell as the second Serving Cell.

Referring back to FIGS. 3 and 4, in one exemplary embodiment of a UE, the device 300 includes a program code 312 stored in the memory 310. The CPU 308 may execute program code 312 to enable the UE (i) to receive a first signaling indicating a configuration of a first cell, wherein the first cell is associated with a first TAG, (ii) to receive a second signaling (e.g., a PDCCH signaling and/or a MAC CE) indicative of addition of the first cell as a first Serving Cell, and (iii) in response to the second signaling, to (A) add the first cell as the first Serving Cell, and determine whether to initiate a random access procedure based on the second signaling and/or whether the first cell is associated with a first valid timing advance value. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 18-22. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 18-22, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network node). The increased efficiency may be a result of enabling the UE to handle time alignment for cells (e.g., SCells) in mobility changes (e.g., L1/L2 mobility enhancing SCell/SCG changes), thereby enabling the UE to change cells (e.g., change from using one or more first cells to using one or more second cells) and/or add and/or activate cells.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based on design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
- receiving a first signaling indicating a configuration of a first cell, wherein the first cell is associated with a first timing advance group (TAG);
- receiving a second signaling indicative of (i) switching a SpCell of the UE to the first cell and (ii) a timing advance information; and
- in response to the second signaling:
  - switching the SpCell of the UE to the first cell; and
  - determining whether to initiate a random access procedure on the first cell based on at least whether the timing advance information is valid.

2. The method of claim 1, wherein:
at least one of the first signaling or the second signaling is indicative of:
a TAG associated with the timing advance information.

3. The method of claim 1, comprising:
applying the timing advance information associated with the first cell in response to the second signaling if the timing advance information is valid.

4. The method of claim 1, comprising:
applying the timing advance information associated with the first cell after adding the first cell as a first Serving Cell.

5. The method of claim 1, comprising:
initiating the random access procedure based on at least a determination that the timing advance information associated with the first cell is invalid.

6. The method of claim 1, comprising:
not initiating the random access procedure based on the timing advance information associated with the first cell being valid.

7. The method of claim 1, wherein:
the timing advance information indicates whether to initiate the random access procedure.

8. The method of claim 1, wherein:
switching the SpCell of the UE to the first cell comprises applying the configuration of the first cell.

9. The method of claim 1, wherein:
the first signaling is indicative of a second configuration of a second cell, wherein the second cell is associated with a second TAG.

10. The method of claim 9, wherein:
the second signaling is indicative of addition of the second cell as a second Serving Cell; and
the method comprises adding the second cell as the second Serving Cell in response to the second signaling.

11. The method of claim 9, wherein:
the determination, in response to the second signaling, of whether to initiate the random access procedure on the second cell is based on whether the second cell is associated with a second valid timing advance value.

12. The method of claim 11, comprising:
initiating the random access procedure on the second cell based on a determination that:
the timing advance information associated with the first cell is valid; and
no valid timing advance value is associated with the second cell.

13. The method of claim 9, wherein:
the second signaling is indicative of at least one of:
a second valid timing advance value associated with the second cell; or
a TAG associated with the second valid timing advance value.

14. The method of claim 9, wherein:
at least one of the first signaling or the second signaling is indicative of at least one of:
the timing advance information and a second valid timing advance value associated with the second cell; or
a TAG associated with the timing advance information and a TAG associated with the second valid timing advance value.

15. The method of claim 1, wherein:
the second signaling comprises a Medium Access Control (MAC) Control Element (CE).

16. A User Equipment (UE), the UE comprising:
a control circuit;
a processor installed in the control circuit; and
a memory installed in the control circuit and operatively coupled to the processor, wherein the processor is configured to execute a program code stored in the memory to perform operations, the operations comprising:
receiving a first signaling indicating a configuration of a first cell, wherein the first cell is associated with a first timing advance group (TAG);
receiving a second signaling indicative of (i) switching a SpCell of the UE to the first cell and (ii) a timing advance information; and
in response to the second signaling:
switching the SpCell of the UE to the first cell; and
determining whether to initiate a random access procedure on the first cell based on at least whether the timing advance information is valid.

17. The UE of claim 16, wherein:
at least one of the first signaling or the second signaling is indicative of
a TAG associated with the timing advance information.

18. The UE of claim 16, the operations comprising:
initiating the random access procedure based on at least a determination that the timing advance information associated with the first cell is invalid.

19. The UE of claim 16, the operations comprising:
not initiating the random access procedure based on the timing advance information associated with the first cell being valid.

20. The UE of claim 16, wherein:
the timing advance information indicates whether to initiate the random access procedure.

* * * * *